US008597729B2

(12) United States Patent
Fournier-Bidoz et al.

(10) Patent No.: US 8,597,729 B2
(45) Date of Patent: Dec. 3, 2013

(54) SYSTEMS AND METHODS FOR MANUFACTURING QUANTUM DOT-DOPED POLYMER MICROBEADS

(75) Inventors: Sebastien Fournier-Bidoz, Toronto (CA); Warren Che Wor Chan, Toronto (CA)

(73) Assignee: FIO Corporation, Toronto (CA)

( * ) Notice: Subject to any disclaimer, the term of this patent is extended or adjusted under 35 U.S.C. 154(b) by 500 days.

(21) Appl. No.: 12/666,112

(22) PCT Filed: Jun. 23, 2008

(86) PCT No.: PCT/CA2008/001204
§ 371 (c)(1),
(2), (4) Date: Dec. 17, 2010

(87) PCT Pub. No.: WO2009/000084
PCT Pub. Date: Dec. 31, 2008

(65) Prior Publication Data
US 2012/0156490 A1   Jun. 21, 2012

Related U.S. Application Data

(60) Provisional application No. 60/945,724, filed on Jun. 22, 2007.

(51) Int. Cl.
*B05D 1/02* (2006.01)
*B05D 1/26* (2006.01)
*B05D 1/34* (2006.01)
*B05D 1/42* (2006.01)
*B05B 1/34* (2006.01)
*B05B 7/26* (2006.01)
*B32B 5/16* (2006.01)

(52) U.S. Cl.
USPC .............. 427/212; 239/10; 239/196; 239/246; 239/380; 239/398; 427/426; 427/427.4; 427/444

(58) Field of Classification Search
CPC .............. B05D 1/02; B05D 1/26; B05D 1/34; B05D 1/42; B05B 7/00; B05B 7/26; B05B 1/34
USPC .......... 427/212, 426, 427.4, 444; 239/10, 196, 239/246, 380, 398
See application file for complete search history.

(56) References Cited

U.S. PATENT DOCUMENTS 5,244,630 A   9/1993   Khalil et al.
5,662,824 A   9/1997   Sang et al.
(Continued)

FOREIGN PATENT DOCUMENTS

CA   2061574   8/1992
CA   2021587   4/2003
(Continued)

OTHER PUBLICATIONS

Cozar-Bernal et al., Insulin-loaded PLGA microparticles: flow focusing versus double emulsion/solvent evaporation, J. of Microencapsulation, 2011, 28(5): 430-441 (DOI 10.3109/02652048.2011.576786).*

(Continued)

*Primary Examiner* — Hoa (Holly) Le
(74) *Attorney, Agent, or Firm* — DLA Piper LLP US; Jennifer E. Lacroix

(57) ABSTRACT

In a method and system for forming microbeads, a polymer solution includes particles and a polymer dissolved in a solvent. A stream of the polymer solution flows into a chamber. A focusing fluid contacts and focuses the polymer stream in the chamber. The focusing fluid and the focused polymer stream flow, as a single flow stream, out from the chamber. Pendant droplets detach from a leading end of the single flow stream to form the microbeads. The focusing fluid reacts with the polymer solution to form functional groups at a surface of the microbeads for binding with biorecognition molecules. In the system, a flow focusing apparatus includes a flow focusing body shaped to define the chamber. Microbeads formed according to the methods and systems are also disclosed.

59 Claims, 5 Drawing Sheets

(56) References Cited

U.S. PATENT DOCUMENTS

| | | |
|---|---|---|
| 5,714,390 A | 2/1998 | Hallowitz et al. |
| 5,786,219 A | 7/1998 | Zhang et al. |
| 5,817,458 A | 10/1998 | King et al. |
| 5,837,442 A | 11/1998 | Tsang |
| 6,011,252 A | 1/2000 | Jensen |
| 6,022,500 A | 2/2000 | John et al. |
| 6,066,243 A | 5/2000 | Anderson et al. |
| 6,100,541 A | 8/2000 | Nagle et al. |
| 6,103,379 A | 8/2000 | Margel et al. |
| 6,114,038 A | 9/2000 | Castro et al. |
| 6,119,953 A | 9/2000 | Ganan-Calvo et al. |
| 6,172,193 B1 | 1/2001 | Primi et al. |
| 6,174,469 B1 | 1/2001 | Ganan-Calvo |
| 6,261,779 B1 | 7/2001 | Barbera-Guillem et al. |
| 6,274,323 B1 | 8/2001 | Bruchez et al. |
| 6,309,701 B1 | 10/2001 | Barbera-Guillem |
| 6,316,781 B1 | 11/2001 | Nagle et al. |
| 6,319,607 B1 | 11/2001 | Barbera-Guillem et al. |
| 6,333,110 B1 | 12/2001 | Barbera-Guillem |
| 6,340,588 B1 | 1/2002 | Nova et al. |
| 6,353,475 B1 | 3/2002 | Jensen et al. |
| 6,357,670 B2 | 3/2002 | Ganan-Calvo |
| 6,399,952 B1 | 6/2002 | Maher et al. |
| 6,409,900 B1 | 6/2002 | Parce et al. |
| 6,413,401 B1 | 7/2002 | Chow et al. |
| 6,430,512 B1 | 8/2002 | Gallagher |
| 6,468,808 B1 | 10/2002 | Nie et al. |
| 6,494,830 B1 | 12/2002 | Wessel |
| 6,498,353 B2 | 12/2002 | Nagle et al. |
| 6,504,607 B2 | 1/2003 | Jensen et al. |
| 6,506,609 B1 | 1/2003 | Wada et al. |
| 6,514,399 B1 | 2/2003 | Parce et al. |
| 6,524,793 B1 | 2/2003 | Chandler et al. |
| 6,528,165 B2 | 3/2003 | Chandler |
| 6,544,732 B1 | 4/2003 | Chee et al. |
| 6,548,171 B1 | 4/2003 | Barbera-Guillem et al. |
| 6,548,264 B1 | 4/2003 | Tan et al. |
| 6,554,202 B2 | 4/2003 | Ganon-Calvo |
| 6,576,155 B1 | 6/2003 | Barbera-Guillem |
| 6,592,821 B1 | 7/2003 | Wada et al. |
| 6,592,822 B1 | 7/2003 | Chandler |
| 6,630,307 B2 | 10/2003 | Bruchez et al. |
| 6,632,655 B1 | 10/2003 | Mehta et al. |
| 6,649,138 B2 | 11/2003 | Adams et al. |
| 6,673,662 B2 | 1/2004 | Singh |
| 6,680,211 B2 | 1/2004 | Barbera-Guillem et al. |
| 6,699,723 B1 | 3/2004 | Weiss et al. |
| 6,720,411 B2 | 4/2004 | Mirkin et al. |
| 6,734,420 B2 | 5/2004 | Empedocles et al. |
| 6,740,491 B2 | 5/2004 | Mirkin et al. |
| 6,752,966 B1 | 6/2004 | Chazan |
| 6,759,235 B2 | 7/2004 | Empedocles et al. |
| 6,767,706 B2 | 7/2004 | Quake et al. |
| 6,772,070 B2 | 8/2004 | Gilmanshin et al. |
| 6,773,812 B2 | 8/2004 | Chandler et al. |
| 6,778,724 B2 | 8/2004 | Wang et al. |
| 6,787,088 B2 | 9/2004 | Parce et al. |
| 6,835,326 B2 | 12/2004 | Barbera-Guillem |
| 6,872,249 B2 | 3/2005 | Peng et al. |
| 6,881,537 B1 | 4/2005 | Goudsmit et al. |
| 6,881,821 B2 | 4/2005 | Simmonds et al. |
| 6,890,764 B2 | 5/2005 | Chee et al. |
| 6,905,885 B2 | 6/2005 | Colsten et al. |
| 6,966,880 B2 | 11/2005 | Boecker et al. |
| 6,978,212 B1 | 12/2005 | Sunshine |
| 6,986,837 B2 | 1/2006 | Chow et al. |
| 7,037,729 B2 | 5/2006 | Nie et al. |
| 7,041,362 B2 | 5/2006 | Barbera-Guillem |
| 7,069,191 B1 | 6/2006 | Moore |
| 7,077,328 B2 | 7/2006 | Krishnaswamy et al. |
| 7,079,241 B2 | 7/2006 | Empedocles et al. |
| 7,166,475 B2 | 1/2007 | Colyer et al. |
| 7,171,983 B2 | 2/2007 | Chien et al. |
| 7,192,785 B2 | 3/2007 | Nie et al. |
| 7,243,670 B2 | 7/2007 | Witt et al. |
| 7,252,928 B1 | 8/2007 | Hafeman et al. |
| 7,267,799 B1 | 9/2007 | Borich et al. |
| 2001/0027918 A1 | 10/2001 | Parce et al. |
| 2001/0028055 A1 | 10/2001 | Fafard et al. |
| 2001/0046602 A1 | 11/2001 | Chandler et al. |
| 2001/0055764 A1 | 12/2001 | Empedocles et al. |
| 2002/0009728 A1 | 1/2002 | Bittner et al. |
| 2002/0022273 A1 | 2/2002 | Empedocles et al. |
| 2002/0031783 A1 | 3/2002 | Empedocles et al. |
| 2002/0037499 A1 | 3/2002 | Quake et al. |
| 2002/0045045 A1 | 4/2002 | Adams et al. |
| 2002/0048425 A1 | 4/2002 | McBride et al. |
| 2002/0051971 A1 | 5/2002 | Stuelpnagel et al. |
| 2002/0059030 A1 | 5/2002 | Otworth et al. |
| 2002/0066401 A1 | 6/2002 | Peng et al. |
| 2002/0118355 A1 | 8/2002 | Worthington et al. |
| 2002/0144644 A1 | 10/2002 | Zehnder et al. |
| 2002/0164271 A1 | 11/2002 | Ho |
| 2002/0182609 A1 | 12/2002 | Arcot |
| 2003/0003441 A1 | 1/2003 | Colston et al. |
| 2003/0017264 A1 | 1/2003 | Treadway et al. |
| 2003/0026740 A1 | 2/2003 | Staats |
| 2003/0073086 A1 | 4/2003 | Guire et al. |
| 2003/0099940 A1 | 5/2003 | Empedocles et al. |
| 2003/0132538 A1 | 7/2003 | Chandler |
| 2003/0148530 A1 | 8/2003 | Lauks |
| 2003/0148544 A1 | 8/2003 | Nie et al. |
| 2003/0157327 A1 | 8/2003 | Barbera-Guillem et al. |
| 2003/0165951 A1 | 9/2003 | Bruchez, Jr. et al. |
| 2003/0170613 A1 | 9/2003 | Straus et al. |
| 2003/0172043 A1 | 9/2003 | Guyon et al. |
| 2003/0175773 A1 | 9/2003 | Chee et al. |
| 2003/0176183 A1 | 9/2003 | Drucker et al. |
| 2003/0177038 A1 | 9/2003 | Rao |
| 2003/0177941 A1 | 9/2003 | Barbera-Guillem |
| 2003/0190628 A1 | 10/2003 | Nakao et al. |
| 2003/0194350 A1 | 10/2003 | Stamatelos et al. |
| 2004/0009341 A1 | 1/2004 | Naasani |
| 2004/0067485 A1 | 4/2004 | Mayes et al. |
| 2004/0072428 A1 | 4/2004 | Sato et al. |
| 2004/0096363 A1 | 5/2004 | Porter |
| 2004/0101621 A1 | 5/2004 | Adams et al. |
| 2004/0106218 A1 | 6/2004 | Wang et al. |
| 2004/0118684 A1 | 6/2004 | Wainright et al. |
| 2004/0147031 A1 | 7/2004 | Nakao |
| 2004/0176704 A1 | 9/2004 | Stevens et al. |
| 2004/0203170 A1 | 10/2004 | Barbera-Guillem |
| 2004/0204633 A1 | 10/2004 | Rentea et al. |
| 2004/0229261 A1 | 11/2004 | Young |
| 2004/0241424 A1 | 12/2004 | Barbera-Guillem |
| 2004/0241752 A1 | 12/2004 | Anderson et al. |
| 2004/0247861 A1 | 12/2004 | Naasani |
| 2004/0248167 A1 | 12/2004 | Quake et al. |
| 2004/0266022 A1 | 12/2004 | Sundararajan et al. |
| 2004/0267568 A1 | 12/2004 | Chandler et al. |
| 2005/0004346 A1 | 1/2005 | Dziegiel et al. |
| 2005/0009002 A1 | 1/2005 | Chen et al. |
| 2005/0011764 A1 | 1/2005 | Berndt et al. |
| 2005/0014134 A1 | 1/2005 | West et al. |
| 2005/0032047 A1 | 2/2005 | Simmonds et al. |
| 2005/0043894 A1 | 2/2005 | Fernandez et al. |
| 2005/0059030 A1 | 3/2005 | Bao et al. |
| 2005/0071199 A1 | 3/2005 | Riff |
| 2005/0106257 A1 | 5/2005 | Albayrak |
| 2005/0112277 A1 | 5/2005 | Banerjee et al. |
| 2005/0120946 A1 | 6/2005 | Hines et al. |
| 2005/0128479 A1 | 6/2005 | Gilbert et al. |
| 2005/0164264 A1 | 7/2005 | Shipwash |
| 2005/0214536 A1 | 9/2005 | Schrier et al. |
| 2005/0221296 A1 | 10/2005 | Simmonds et al. |
| 2005/0227370 A1 | 10/2005 | Ramel et al. |
| 2005/0239118 A1 | 10/2005 | Goudsmit et al. |
| 2006/0008921 A1 | 1/2006 | Daniels et al. |
| 2006/0012784 A1 | 1/2006 | Ulmer |
| 2006/0014040 A1 | 1/2006 | Peng et al. |
| 2006/0019098 A1 | 1/2006 | Chan et al. |
| 2006/0029267 A1 | 2/2006 | Frost et al. |
| 2006/0046330 A1 | 3/2006 | Chen et al. |
| 2006/0063160 A1 | 3/2006 | West et al. |

(56) References Cited

U.S. PATENT DOCUMENTS

| | | | |
|---|---|---|---|
| 2006/0068203 | A1 | 3/2006 | Ying et al. |
| 2006/0078490 | A1 | 4/2006 | Shih et al. |
| 2006/0105335 | A1 | 5/2006 | Daehne et al. |
| 2006/0152372 | A1 | 7/2006 | Stout |
| 2006/0169800 | A1 | 8/2006 | Rosell |
| 2006/0173715 | A1 | 8/2006 | Wang |
| 2006/0194030 | A1 | 8/2006 | Barbera-Guillem |
| 2007/0020779 | A1 | 1/2007 | Stavis et al. |
| 2007/0031283 | A1 | 2/2007 | Davis et al. |
| 2007/0081920 | A1 | 4/2007 | Murphy et al. |
| 2007/0104860 | A1 | 5/2007 | Gleason et al. |
| 2007/0154560 | A1* | 7/2007 | Hyon ........................... 424/489 |
| 2011/0081643 | A1* | 4/2011 | Fournier-Bidoz et al. ........ 435/5 |

FOREIGN PATENT DOCUMENTS

| | | | |
|---|---|---|---|
| CA | 2518352 | | 3/2005 |
| EP | 1315099 | | 5/2003 |
| JP | 2002-271 | | 1/2002 |
| JP | 2004-035446 | * | 5/2004 |
| JP | 2005-508493 | | 3/2005 |
| JP | 2007-186456 | | 7/2007 |
| WO | 99/19000 | | 4/1999 |
| WO | 99/36564 | | 7/1999 |
| WO | 99/64840 | | 12/1999 |
| WO | 99/66318 | | 12/1999 |
| WO | 00/13580 | | 3/2000 |
| WO | 00/28598 | | 5/2000 |
| WO | 00/70080 | | 11/2000 |
| WO | 01/20533 | | 3/2001 |
| WO | 01/89585 | | 11/2001 |
| WO | 01/93754 | | 12/2001 |
| WO | 02/04484 | | 1/2002 |
| WO | 03/003015 | | 1/2003 |
| WO | 2004/008550 | | 1/2004 |
| WO | 2004/040319 | | 5/2004 |
| WO | 2005/023923 | | 3/2005 |
| WO | 2005/031802 | | 4/2005 |
| WO | 2005/052996 | | 6/2005 |
| WO | 2005/053649 | | 6/2005 |
| WO | 2005/061095 | | 7/2005 |
| WO | WO 2005/061095 | | 7/2005 |
| WO | 2006/033732 | | 3/2006 |
| WO | 2006/045004 | | 4/2006 |
| WO | WO 2006/072306 | | 7/2006 |
| WO | 2006/132953 | | 12/2006 |
| WO | 2007/011622 | | 1/2007 |
| WO | 2008/089155 | | 7/2008 |
| WO | 2008/147382 | | 12/2008 |
| WO | 2009/059404 | | 5/2009 |

OTHER PUBLICATIONS

Alivisatos, A.P., Perspectives on the Physical Chemistry of Semiconductor Nanocrystals, Journal of Physical Chemistry, 1996, pp. 13226-13239, vol. 100, No. 31, American Chemical Society, USA.

Bakalova, Rurniana et al., Quantum dot-conjugated hybridization probes for preliminary screening of siRNA sequences, Journal of the American Chemical Society, Aug. 1, 2005, pp. 11328-11335, vol. 127, No. 32, American Chemical Society, USA.

Boldt, Klaus et al., Comparative Examination of the Stability of Semiconductor Quantum Dots in Various Biochemical Buffers, Journal of Physical Chemistry B, 2006, pp. 1959-1963, vol. 110, No. 5, American Chemical Society, USA.

Branch, Mary Ann et al., A Subspace, Interior, and Conjugate Gradient Method for Large-Scale Bound-Constrained Minimization Problems, SIAM J. Sci. Comput., Aug. 3, 1999, pp. 1-23, vol. 21, No. 1, Society for Industrial and Applied Mathematics.

Bruchez, Marcel Jr. et al., Semiconductor Nanocrystals as Fluorescent Biological Labels, Science, Sep. 25, 1998, pp. 2013-2015, vol. 281, American Association for the Advancement of Science, USA.

Burns, Mark A. et al., An Integrated Nanoliter DNA Analysis Device, Science, Oct. 16, 1998, pp. 484-487, vol. 282, No. 5388, American Association for the Advancement of Science, USA.

Chabinyc, Michael L. et al., An Integrated Fluorescence Detection System in Poly(dimethylsiloxane) for Microfluidic Applications, Analytical Chemistry, Sep. 15, 2001, pp. 4494-4498, vol. 73, No. 18, American Chemical Society, USA.

Chan, Eugene Y. et al., DNA Mapping Using Microfluidic Stretching and Single-Molecule Detection of Fluorescent Site-Specific Tags, Genome Research, 2004, pp. 1137-1146, vol. 14, Cold Spring Harbour Laboratory Press, USA.

Chan, Warren C.W. et al., Luminescent quantum dots for multiplexed biological detection and imaging, Current Opinion in Biotechnology, 2002, pp. 40-46, vol. 13, Elsevier Science Ltd.

Chan, Warren C.W. et al., Quantum Dot Bioconjugates for Ultrasensitive Nonisotopic Detection, Science, Sep. 25, 1998, pp. 2016-2018, vol. 281, American Association for the Advancement of Science, USA.

Chou, Hou-Pu et al., A microfabricated device for sizing and sorting DNA molecules, PNAS—Proceedings of the National Academy of Sciences of the United States of America, Jan. 1999, pp. 11-13, vol. 96, The National Academy of Sciences, USA.

Dabbousi, B.O. et al., (CdSe)ZnS Core-Shell Quantum Dots: Synthesis and Characterization of a Size Series of Highly Luminescent Nanocrystallites, Journal of Physical Chemistry B, 1997, pp. 9463-9475, vol. 101, No. 46, American Chemical Society, USA.

Duffy, D.C. et al., Rapid Prototyping of Microfulidic Systems in Poly(dimethylsiloxane), Analytical Chemistry, Dec. 1, 1998, pp. 4974-4984, vol. 70, No. 23, American Chemical Society, USA.

Eisenstein, Michael, Technology Feature: Protein Arrays—Growing pains, Losing the Label, an Apt Solution? & (Almost) No Assembly Required, Nature, Dec. 14, 2006, pp. 959-962, vol. 444, Nature Publishing Group, USA.

Fournier-Bidoz, Sebastien et al., Facile and Rapid One-Step Mass Preparation of Quantum-Dot Barcodes, Angewandte Chemie International Edition, 2008, pp. 5577-5581, vol. 47, No. 30, Wiley-VCH Verlag GmbH & Co. KGaA, Weinheim.

Fu, Anne Y. et al., A microfabricated fluorescence-activated cell sorter, Nature Biotechnology, Nov. 1999, pp. 1109-1111, vol. 17, Nature America Inc., USA.

Fu, Lung-Ming et al., Multiple injection techniques for microfluidic sample handling, Electrophoresis, 2003, pp. 3026-3032, vol. 24, Wiley-VCH Verlag GmbH & Co. KGaA, Weinheim.

Gao, Xiaohu et al., In vivo cancer targeting and imaging with semiconductor quantum dots, Nature Biotechnology, Jul. 18, 2004, pp. 969-976, vol. 22, No. 8, Nature Publishing Group, USA.

Gao, Xiaohu et al., Quantum Dot-Encoded Mesoporous Beads with High Brightness and Uniformity: Rapid Readout Using Flow Cytometry, Analytical Chemistry, Apr. 15, 2004, pp. 2406-2410, vol. 76, No. 8, American Chemical Society, USA.

Gao, Xiaohu et al., Quantum-dot nanocrystals for uttrasensitive biological labelling and mulitcolor optical encoding, Journal of Biomedical Optics, Oct. 2002, pp. 532-537, vol. 7, No. 4, SPIE.

Gaponik, Nikolai et al., Toward Encoding Combinatorial Libraries: Charge-Driven Microencapsulation of Semiconductor Nanocrystals Luminescing in the Visible and Near IR, Advanced Materials, Jun. 18, 2002, pp. 879-882, vol. 14, No. 12, Wiley-VCH Verlag GmbH, Weinheim.

Gershon, Diane, Technology Feature: DNA Microarrays—More than than gene expression, It's a Small World, Microassays Move Downstream & on the Hardware Front, Nature, Oct. 20, 2005, pp. 1195-1198, vol. 437, Nature Publishing Group, USA.

Goluch, E.D. et al., A bio-barcode assay for on-chip attomolar-sensitivity protein detection, Lab on a Chip, Aug. 15, 2006, pp. 1293-1299, vol. 6, The Royal Society of Chemistry.

Grumann, M. et al., Parallelization of Chip-Based Fluorescence Immuno-Assays with Quantum-Dot Labelled Beads, The 13th International Conference on Solid-State Sensors, Actuators and Microsystems, Jun. 2005, pp. 1114-1117, IEEE.

Han, Mingyong et al., Quantum-dot-tagged microbeads for multiplexed optical coding of biomolecules, Nature Biotechnology, Jul. 2001, pp. 631-635, vol. 19, Nature Publishing Group, USA.

Hines, Margaret A. et al., Synthesis and Characterization of Strongly Luminescing ZnS-Capped CdSe Nanocrystals, Journal of Physical Chemistry B, 1996, pp. 468-471, vol. 100, No. 2, American Chemical Society, USA.

(56) References Cited

OTHER PUBLICATIONS

Kloepfer, Jeremiah A. et al., Photophysical Properties of Biologically Compatible CdSe Quantum Dot Structures, Journal of Physical Chemistry B, 2005, pp. 9996-10003, vol. 109, No. 20, American Chemical Society, USA.

Klostranec, Jesse M. et al., Convergence of Quantum Dot Barcodes with Microfluidics and Signal Processing for Multiplexed High-Throughput Infectious Disease Diagnostics, Nano Letters, Aug. 18, 2007, pp. 2812-2818, vol. 7, No. 9, American Chemical Society, USA.

Klostranec, Jesse M. et al., Quantum Dots in Biological and Biomedical Research: Recent Progress and Present Challenges, Advanced Materials, Aug. 4, 2006, pp. 1953-1964, vol. 18, No. 15, Wiley-VCH Verlag GmbH & Co. KGaA, Weinheim.

Li, Yougen et al., Multiplexed detection of pathogen DNA with DNA-based fluorescence nanobarcodes, Nature Biotechnology, Jul. 2005, pp. 885-889, vol. 23, No. 7, Nature Publishing Group, USA.

Liu, Wen-Tso et al., Microfluidic device as a new platform for immunofluorescent detection of viruses, Lab on a Chip, Oct. 4, 2005, pp. 1327-1330, vol. 5, The Royal Society of Chemistry.

Malamud, D. et al., Point Detection of Pathogens in Oral Samples, Adv Dent Res, Jun. 2005, pp. 12-16, vol. 18.

Marti et al., Design and characterization of two-dye and three-dye binary fluorescent probes for mRNA detection, Tetrahedron, Mar. 21, 2007, pp. 3591-3600, vol. 63, No. 17, Elsevier Science Publishers, Amsterdam, NL.

Mattoussi, H. et al., Luminescent Quantum Dot-Bioconjugates in Immunoassays, FRET, Biosensing, and Imaging Applications, JALA—Journal of the Association for Laboratory Automation, Feb. 2004, pp. 28-32, vol. 9, No. 1, The Association for Laboratory Automation, USA.

Medintz, Igor L. et al., Quantum dot bioconjugates for imaging, labelling and sensing, Nature Materials, Jun. 2005, pp. 435-446, vol. 4, Nature Publishing Group, USA.

Moré, Jorge J. et al., Computing a Trust Region Step, SIAM J. Sci. Stat. Comput., Sep. 1983, pp. 553-572, vol. 4, No. 3, Society for Industrial and Applied Mathematics.

Murray, C.B. et al., Synthesis and Characterization of Nearly Monodisperse CdE (E=S, Se, Te) Semiconductor Nanocrystallites, Journal of the American Chemical Society, 1993, pp. 8706-8715, vol. 115, No. 19, American Chemical Society, USA.

Neogi, A. et al., Enhanced luminescence efficiency from hydrogel microbead encapsulated quantum dots, Materials Research Society Symposium Proceedings, Jan. 1, 2007, pp. 202-207, vol. 959, Materials Research Society, USA.

Peng, Xiaogang et al., Epitaxial Growth of Highly Luminescent CdSe/CdS Core/Shell Nanocrystals with Photostability and Electronic Accessibility, Journal of the American Chemical Society, 1997, pp. 7019-7029, vol. 119, No. 30, American Chemical Society, USA.

Pregibon, Daniel C. et al., Multifunctional Encoded Particles for High-Throughput Biomolecule Analysis, Science, Mar. 9, 2007, pp. 1393-1396, vol. 315, American Association for the Advancement of Science, USA [downloaded on Mar. 9, 2009 from http://www.sciencemag.org].

Sathe, Tushar R. et al., Mesoporous Silica Beads Embedded With Semiconductor Quantum Dots and Iron Oxide Nanocrystals: Dual-Function Microcarriers for Optical Encoding and Magnetic Separation, Analytical Chemistry, Jul. 20, 2006, pp. 5627-5632, , vol. 78, No. 16, American Chemical Society, USA.

Service, Robert F., DNA Analysis: Microchip Arrays Put DNA on the Spot, Science, Oct. 16, 1998, pp. 396-399, vol. 282, No. 5388, American Association for the Advancement of Science, USA [downloaded on Mar. 20, 2008 from http://www.sciencemag.org/cgi/content/full/282/5388/396].

Stavis, Samuel M. et al., Single molecule studies of quantum dot conjugates in a submicrometer fuidic channel, Lab on a Chip, Jan. 13, 2005, pp. 337-343, vol. 5, The Royal Society of Chemistry.

Sukhanova, A. et al., Nanocrystal-encoded fluorescent microbeads for proteomics: Antibody profiling and diagnostics of autoimmune diseases, Nano Letters, Aug. 2007, pp. 2322-2327, vol. 7, No. 8, American Chemical Society, USA.

Thomson, B. et al, Dispersion Copolymerization of Styrene and Divinylbenzee. II. Effect of Crosslinker on Particle Morphology, Journal of Applied Polymer Science, 1996, pp. 2009-2028, vol. 59, John Wiley & Sons, Inc.

Xu, Hongxia et al., Muliplexed SNP genotyping using the Qbead™ system: A quantum dot-encoded microsphere-based assay, Nucleic Acids Research, 2003, pp. 1-10, vol. 31, No. 8, Oxford University Press.

Xuan, Xiangchun et al., Focused electrophoretic motion and selected electrokinetic dispensing of particles of particles and cells in cross-microchannels, Electrophoresis, 2005, pp. 3552-3560, vol. 26, Wiley-VCH Verlag GmbH & co. KGaA, Weinheim.

Yun, Kwang-Seok et al., A microfluidic chip for measurement of biomolecules using a microbead-based quantum dot fluorescence assay, Measurement Science and Technology, 2006, pp. 3178-3183, vol. 17, IOP Publishing Ltd, UK.

Zaytseva, Natalya V. et al., Development of a microfluidic biosensor module for pathogen detection, Lab on a Chip, Jul. 6, 2005, pp. 805-811, vol. 5, The Royal Society of Chemistry.

International Search Report for PCT/CA2008/001204, 2008.

Written Opinion of the International Searching Authority for PCT/CA2008/001204, 2008.

\* cited by examiner

SYSTEMS AND METHODS FOR MANUFACTURING QUANTUM DOT-DOPED POLYMER MICROBEADS

FIELD OF THE INVENTION

The present invention relates generally to the field of detectable polymer microbeads for use as diagnostic tools, and more particularly, to systems and methods for manufacturing polymer microbeads doped with identifiable particles, preferably nanoparticles and more preferably quantum dots, using directed and controlled flows of fluids.

BACKGROUND OF THE INVENTION

Detection and/or characterization of diseases and/or ailments in a host can be a complex process that may typically involve the identification of one or more causative agents (e.g., pathogens). There may also frequently have existed a need and/or desire to detect, characterize and/or identify one or more poisons, toxins, and/or genetic expression factors.

Substantially spherical particles (also known as microspheres or microbeads) bearing identifiable labels and/or markings—colloquially called "barcoded microbeads"—may have been used in parallel multiplexed analyses and/or in the identification of disease-related targets, toxin-related targets, and/or gene-related targets. Barcoded microbeads may have been previously conjugated to biorecognition molecules ("BRMs")—i.e., to molecules having an affinity for, and/or an ability to interact with, one or more specific targets. Different targets may be bound to corresponding BRMs conjugated with barcoded microbeads, such as to enable identification of the targets.

Dye-labeled fluorescent microspheres may have been previously considered as a potential alternative to traditional microarrays, insofar as they may have been thought to allow for multiplexed color detection with a measure of flexibility in target selection, somewhat improved binding rates, and/or reduced costs in production. Dye-labeled fluorescent microbead-based arrays may have been thought to allow for use of different sized microbeads and/or different colored microbeads, so as to permit identification of different bead populations individually linked to specific biomolecules. The functionality of dye-labeled fluorescent microbead-based arrays may, however, have heretofore relied heavily upon one or more properties of the microspheres utilized (e.g., size, stability, uniformity, and/or ability to retain fluorescent dyes).

Previously, polymeric dye-labeled fluorescent microspheres may have been one of the most widely used microsphere systems. Polymer matrices may have advantageously protected the embedded dyes from external quenching agents, photobleaching, and/or the effects of solvent polarity, pH and/or ionic strength, possibly whilst also providing surface reactive functional groups for conjugation with different compounds, and possibly without overly negatively affecting the fluorescent properties of the microspheres.

Unfortunately, however, there has not yet been developed any simple one-step method for the large scale manufacture of labeled and/or marked polymer microbeads having a uniform shape, homogenous distribution, and/or controlled fluorescent properties.

Moreover, the use of polymer microbeads as probes in multiplexed diagnostic analyses, in which the microbeads are designed to bind to specific targets, may require not only that the various types of microbeads be detectable, but also for them to be distinguishable from one another. This kind of barcoding can be accomplished by embedding the beads with nanometer-sized fluorophores, such as quantum dots (QDs).

QDs are semiconductor nanoparticles that may exhibit size-tunable and composition-tunable fluorescence emission of symmetric and/or narrow bandwidths. QDs may typically exhibit optical and/or electronic properties that may usually be observed neither in discrete atoms, nor in bulk solids. These properties of QDs may be attributable to their physical dimensions (i.e., they are typically smaller than the exciton Bohr radius). In the result, quantum confinement may cause QDs to exhibit their somewhat unique (size-dependent) properties.

Though not essential to the working of the present invention, it may be generally thought that, with smaller and smaller QDs, the band gap energy increases, as does the energy of the photons emitted. For example, blue-light emitting QDs may be one of the smallest, if not the smallest, sized QDs which emit visible light. Conversely, the larger the size of the QD, the smaller the band gap energy. The color of the fluorescence emitted by larger QDs may, therefore, be situated generally toward the red end of the visible light spectrum.

In addition to their optical tunability, QDs may have broad excitation profiles and narrow, symmetric emission spectra. These features, among others, may make them well-suited to optical multiplexing and/or for use in association with optical barcoding technologies.

A wide variety of somewhat well-characterized QDs may be presently available. The most common may be composed of atoms from group IIB-VIB, group IIIB-VB and/or group IVB-IVB elements in the periodic table. The core of a QD may often be passivated with a cap formed from a second semiconductor which possesses a band gap energy that is greater than that of the core. For example, combinations of elements in groups IIB-VIB may sometimes be suitable second semiconductors. One commonly used QD may consist of a ZnS-capped CdSe core.

Compared to organic dyes, QDs may have similar and/or slightly lower quantum yields. This feature of QDs may be compensated for by their somewhat broader excitation profiles, higher extinction coefficients, and/or much reduced photobleaching. The size-dependent properties of QDs which might make their use preferable in comparison to dyes may also, however, be what makes them more difficult to manipulate.

The incorporation of QDs into polymer microbeads, as an alternative to organic dyes, may create additional manufacturing challenges and/or may increase the need for high quality, uniform and/or stable polymer beads.

Accordingly, it may be desirable and/or necessary to provide a method and/or system that allows for large scale manufacture of polymer microbeads. Preferably, such a system and/or method may allow for the incorporation of QDs and/or for the control of various parameters, such as the following: (i) bead diameter, (ii) degree of monodispersity, (iii) bead surface morphology, and/or (iv) rate of production—i.e., high-throughput.

One prior art approach for encapsulating QDs into preformed polystyrene microbeads may have involved swelling the microbeads in an organic solvent and in the presence of QDs. In this manner, the QDs may have been allowed to diffuse into the polymer matrices. The microbeads may then have been subsequently shrunk by evaporating the organic solvent, so as to leave the QDs 'trapped' inside. Major drawbacks of this prior art technique may have included difficulties in controlling the QD density inside the beads and/or diffusion of QDs out from the polymer matrices.

Other manufacturing approaches for the production of QD-doped polymeric microbeads may have previously involved, for example, batch polymerization syntheses. In such techniques, the polymerization may have taken place substantially contemporaneous with the incorporation of QDs. Problems encountered with this type of approach may have included poor control of bead diameter and/or lack of monodispersity.

Flow focusing techniques may have been previously used in making dye-labeled fluorescent polymer microspheres (A. M. Ganan-Calvo et al., *International Journal of Pharmaceutics* 324, (2006) 19-26). A number of U.S. patent references may also relate generally to flow focusing technologies for making dye-labeled fluorescent polymer microspheres, including the following: issued U.S. Pat. No. 6,119,953 (Ganan-Calvo), published U.S. patent application Ser. No. 10/649,376 (Ganan-Calvo), and published U.S. patent application Ser. No. 11/615,732 (Ganan-Calvo). Heretofore, however, it has not been readily apparent to those of ordinary skill in the art how one might adapt such flow focusing techniques to make polymer microbeads incorporating nanoparticles (e.g., in particular, QDs and/or magnetic nanoparticles), inter alia, in a one-step method.

A number of problems have instead presented themselves in this regard. Specifically, the flow focusing approach has thus far failed to account for certain technical considerations required to incorporate QDs into polymer microbeads—e.g., QD solubility and stability in the solvent of choice, polymer solubility and compatibility with the QD/solvent system.

One particularly problematic shortcoming of existing flow focusing technologies is their general failure to account for how QD-doped polymer microbeads might be designed for subsequent conjugation to BRMs. In this regard, the polymer of choice must not only be soluble in the QD/solvent system (and not cause the QDs to precipitate out of solution), but the chosen polymer must also have structural features which provide for finished microbeads with surfaces of the appropriate functionality—i.e., to conjugate with the BRMs. It may also be preferable to provide a one-step process for functionalizing the surfaces, so as to help eliminate any subsequent functionalization of the beads which might otherwise be required after their initial synthesis.

In the past, the surfaces of existing microbeads may have been subsequently functionalized with carboxylic acid groups, since these groups may be readily suitable to couple with the amine group of a BRM, so as to covalently bond the BRM to the surfaces of the beads. Prior art polymers with carboxylic acids in their repeating units may, however, have presented a solubility challenge, since they may have been too hydrophilic to dissolve in solvents that are compatible with QDs.

It is, therefore, an object of one preferred embodiment according to the invention to provide a method and/or a system for forming microbeads.

It is an object of one preferred embodiment according to the invention to provide a method and/or a system for forming polymer microbeads.

It is an object of one preferred embodiment according to the invention to provide a method and/or system for forming surface functionalized polymer microbeads.

It is an object of one preferred embodiment according to the invention to provide a method and/or system for forming surface functionalized barcoded polymer microbeads.

It is an object of one preferred embodiment according to the invention to provide a method and/or system for forming surface functionalized nanoparticle-doped polymer microbeads.

It is an object of one preferred embodiment according to the invention to provide a method and/or system for forming surface functionalized QD-doped polymer microbeads.

It is an object of one preferred embodiment according to the invention to provide a method and/or system for forming surface functionalized polymer microbeads that avoid and/or overcome one or more problems previously associated with the large scale manufacture of polymer microbeads.

It is an object of one preferred embodiment according to the invention to develop a one-step method and/or system for the large scale manufacture of barcoded polymer microbeads having a uniform shape, homogenous distribution and/or controlled and readily identiable properties.

It is an object of the present invention to obviate or mitigate one or more of the aforementioned disadvantages associated with the prior art, and/or to achieve one or more of the aforementioned objects of the invention.

SUMMARY OF THE INVENTION

According to the invention, there is disclosed a method of forming microbeads. The method includes steps (a), (b), (c), (d) and/or (e). In step (a), a polymer stream of a polymer solution flows into an interior chamber of a flow focusing body. The polymer solution includes particles and a polymer dissolved in a solvent. In step (b), a focusing fluid flows into the chamber. The focusing fluid is capable of reacting with the polymer solution to form functional groups adapted to bind with biorecognition molecules. In step (c), the focusing fluid is directed into contact with the polymer stream in the chamber, so as to focus the polymer stream. In step (d), the focusing fluid and the polymer stream focused thereby flow, as a single flow stream, out from the chamber. In step (e), pendant droplets are allowed to detach from a leading end portion of the single flow stream so as to form the microbeads. Each of the microbeads binds an identifiable set of the particles. The focusing fluid reacts with the polymer solution to form one or more of the functional groups at a surface of each of the microbeads, such that the microbeads are adapted to bind with the biorecognition molecules.

According to an aspect of one preferred embodiment of the invention, step (b) may preferably, but need not necessarily, be performed substantially contemporaneous with step (a).

According to an aspect of one preferred embodiment of the invention, in step (d), the focusing fluid may preferably, but need not necessarily, substantially surround the polymer stream in the single flow stream.

According to an aspect of one preferred embodiment of the invention, the method may preferably, but need not necessarily, also include step (f) after step (e). In step (f), the microbeads may preferably, but need not necessarily, be collected in a receptacle containing a fluid bath.

According to an aspect of one preferred embodiment of the invention, in step (f), the fluid bath may preferably be stirred and/or the microbeads may preferably be allowed to solidify.

According to an aspect of one preferred embodiment of the invention, the method may preferably, but need not necessarily, also include step (g) after step (e). In step (g), the microbeads may preferably, but need not necessarily, be allowed to solidify and may preferably, but need not necessarily, be recovered from the fluid bath.

According to an aspect of one preferred embodiment of the invention, in step (g), the microbeads may preferably, but need not necessarily, be recovered by centrifugation.

According to an aspect of one preferred embodiment of the invention, the method may preferably, but need not necessarily, also include a preliminary step, before step (a), of forming the polymer solution preferably, but not necessarily, by dissolving the particles and the polymer in the solvent.

According to an aspect of one preferred embodiment of the invention, the method may preferably, but need not necessarily, also include a preliminary step, before step (a), of forming the polymer solution preferably, but not necessarily, by first dissolving the particles in the solvent, and then preferably, but not necessarily, dissolving the polymer therein.

According to an aspect of one preferred embodiment of the invention, in step (a), the solvent may preferably, but need not necessarily, include an organic solvent.

According to an aspect of one preferred embodiment of the invention, in step (a), the polymer may preferably, but need not necessarily, be substantially hydrophobic.

According to an aspect of one preferred embodiment of the invention, in step (a), the polymer may preferably, but need not necessarily, include a polystyrene powder and/or a derivative thereof.

According to an aspect of one preferred embodiment of the invention, in step (a), the polymer may preferably, but need not necessarily, include a polystyrene-acid anhydride copolymer.

According to an aspect of one preferred embodiment of the invention, in step (a), the polystyrene-acid anhydride copolymer may preferably, but need not necessarily, include a polystyrene-maleic anhydride copolymer.

According to an aspect of one preferred embodiment of the invention, the functional groups may preferably, but need not necessarily, be protected in step (a). The functional groups may preferably, but need not necessarily, be deprotected following reaction of the focusing fluid with the polymer solution.

According to an aspect of one preferred embodiment of the invention, the functional groups may preferably, but need not necessarily, include carboxylic acid groups.

According to an aspect of one preferred embodiment of the invention, the carboxylic acid groups may preferably, but need not necessarily, be protected in step (a). The carboxylic acid groups may preferably, but need not necessarily, be deprotected following reaction of the focusing fluid with the polymer solution.

According to an aspect of one preferred embodiment of the invention, in step (b), the focusing fluid may preferably, but need not necessarily, include water. The carboxylic acid groups may preferably, but need not necessarily, be deprotected by hydrolysis with the water.

According to an aspect of one preferred embodiment of the invention, in step (a), the particles may preferably, but need not necessarily, include fluorophores.

According to an aspect of one preferred embodiment of the invention, in step (a), the particles may preferably, but need not necessarily, include nanoparticles.

According to an aspect of one preferred embodiment of the invention, in step (a), the particles may preferably, but need not necessarily, include quantum dots.

According to an aspect of one preferred embodiment of the invention, in step (a), the polymer solution may preferably, but need not necessarily, include a combination of one or more types of the quantum dots. The identifiable set of the quantum dots bound by each of the microbeads may preferably, but need not necessarily, be adapted to, following irradiation, produce one or more identifiable spectral signals based on color and/or intensity.

According to an aspect of one preferred embodiment of the invention, in step (a), the particles may preferably, but need not necessarily, include a combination of quantum dots and magnetic nanoparticles.

According to an aspect of one preferred embodiment of the invention, in step (d), the single flow stream may preferably, but need not necessarily, flow out from the chamber into a focusing orifice. In step (e), the single flow stream may preferably, but need not necessarily, flow out from the focusing orifice. A wet diameter ($d_g$) of each of the microbeads may preferably, but need not necessarily, be directly dependent upon a diameter of the polymer stream in step (e).

According to an aspect of one preferred embodiment of the invention, the wet diameter ($d_g$) of each of the microbeads may preferably, but need not necessarily, be determined according to the following equation:

$$d_g = 1.89 d_j$$

wherein $d_j$ may preferably be the diameter of the polymer stream in step (e).

According to an aspect of one preferred embodiment of the invention, in step (d), the single flow stream may preferably, but need not necessarily, flow out from the chamber into a focusing orifice. In step (e), the single flow stream may preferably, but need not necessarily, flow out from the focusing orifice. A diameter ($d_j$) of the polymer stream in step (e) may preferably, but need not necessarily, be dependent upon: a diameter of the focusing orifice in step (e); a density and/or a flow rate of the polymer solution in step (a); and/or a density and/or a flow rate of the focusing fluid in step (b).

According to an aspect of one preferred embodiment of the invention, the diameter ($d_j$) of the polymer stream in step (e) may preferably, but need not necessarily, be determined according to the following equation:

$$d_j = D \left[ 1 + \left( \frac{\rho_2}{\rho_1} \right)^{1/2} \left( \frac{Q_2}{Q_1} \right) \right]^{-1/2}$$

wherein D may preferably be the diameter of the exit orifice in step (e), $\rho_2$ may preferably be the density of the focusing fluid in step (b), $\rho_1$ may preferably be the density of the polymer solution in step (a), $Q_2$ may preferably be the flow rate of the focusing fluid in step (b), and/or $Q_1$ may preferably be the flow rate of the polymer solution in step (a).

According to an aspect of one preferred embodiment of the invention, a wet diameter ($d_g$) of each of the microbeads may preferably, but need not necessarily, be directly dependent upon a diameter of the polymer stream in step (e). The wet diameter ($d_g$) of each of the microbeads may preferably, but need not necessarily, be determined according to the following equation:

$$d_g = 1.89 d_j$$

wherein $d_j$ is the diameter of the polymer stream in step (e). The density ($\rho_1$) of the polymer solution in step (a), the density ($\rho_2$) of the focusing fluid in step (b), and the diameter (D) of the exit orifice in step (e) may preferably, but need not necessarily, be predetermined. When the flow rate ($Q_1$) of the polymer solution flowing into the chamber is about 1 milliliter per hour (mL/h) and the flow rate ($Q_2$) of the focusing fluid flowing into the chamber is about 180 milliliters per hour (mL/h), the method may preferably, but need not necessarily, form microbeads about 6 micrometers (μm) in diameter.

According to an aspect of one preferred embodiment of the invention, a wet diameter ($d_g$) of each of the microbeads may preferably, but need not necessarily, be directly dependent upon a diameter of the polymer stream in step (e). The wet diameter ($d_g$) of each of the microbeads may preferably, but need not necessarily, be determined according to the following equation:

$$d_g = 1.89 d_j$$

wherein $d_j$ may preferably be the diameter of the polymer stream in step (e). The density ($\rho_1$) of the polymer solution in step (a), the density ($\rho_2$) of the focusing fluid in step (b), and the diameter (D) of the exit orifice in step (e) may preferably, but need not necessarily, be predetermined. When the flow rate ($Q_1$) of the polymer solution flowing into the chamber is about 0.5 milliliters per hour (mL/h) and the flow rate ($Q_2$) of the focusing fluid flowing into the chamber is about 180 milliliters per hour (mL/h), the method may preferably, but need not necessarily, operatively form microbeads about 5 micrometers (μm) in diameter.

According to an aspect of one preferred embodiment of the invention, before step (a), the polymer solution may preferably, but need not necessarily, be formed with a concentration of about 0.04 by weight-weight percentage (4 wt %).

According to an aspect of one preferred embodiment of the invention, the method may preferably, but need not necessarily, also include a first polymer narrowing step of reducing a cross-sectional profile of the polymer stream, preferably before step (a).

According to an aspect of one preferred embodiment of the invention, the method may preferably, but need not necessarily, also include a second polymer narrowing step of further reducing the cross-sectional profile of the polymer stream, preferably after the first narrowing step and preferably before step (a).

According to an aspect of one preferred embodiment of the invention, in step (b), the focusing fluid may preferably, but need not necessarily, flow into the chamber in a focusing stream. The method may preferably, but need not necessarily, also include a focusing fluid narrowing step of reducing a cross-sectional profile of the focusing stream, preferably before step (b).

According to the invention, there is also disclosed a system for forming microbeads. The system includes a polymer solution, a focusing fluid, and a flow focusing apparatus. The polymer solution includes particles and a polymer dissolved in a solvent. The focusing fluid is capable of reacting with the polymer solution to form functional groups adapted to bind with biorecognition molecules. The flow focusing apparatus includes a flow focusing body shaped to define an interior chamber and an exit opening. The chamber operatively receives the focusing fluid and a polymer stream of the polymer solution. The focusing fluid operatively contacts and focuses the polymer stream in the chamber, so as to focus the polymer stream. The focusing fluid and the polymer stream focused thereby operatively flow, as a single flow stream, out from the chamber through the exit opening. Pendant droplets operatively detach from a leading end portion of the single flow stream so as to form the microbeads. Each of the microbeads binds an identifiable set of the particles. The focusing fluid operatively reacts with the polymer solution to form one or more of the functional groups at a surface of each of the microbeads, such that the microbeads are adapted to bind with the biorecognition molecules.

According to an aspect of one preferred embodiment of the invention, the flow focusing apparatus may preferably, but need not necessarily, also include a polymer supply subassembly. The polymer supply subassembly may preferably, but need not necessarily, includes a first polymer nozzle having an entry portion shaped to define an entry opening, an exit portion shaped to define a tip aperture, and a neck portion shaped to define an internal channel running between the entry opening and the tip aperture. The polymer stream may preferably, but need not necessarily, operatively flow into the entry opening, through the internal channel, and/or out from the tip aperture towards the chamber. The first polymer nozzle may preferably, but need not necessarily, be adapted to operatively reduce a cross-sectional profile of the polymer stream during passage therethrough.

According to an aspect of one preferred embodiment of the invention, the polymer supply subassembly may preferably, but need not necessarily, additionally include a second polymer nozzle, preferably connected in series after the first polymer nozzle. The polymer stream may preferably, but need not necessarily, operatively flow from the tip aperture of the first polymer nozzle into an entry opening defined by an entry portion of the second polymer nozzle, through an internal channel defined by a neck portion of the second polymer nozzle, and/or out from a tip aperture defined by an exit portion of the second polymer nozzle towards the chamber.

According to an aspect of one preferred embodiment of the invention, the second polymer nozzle may preferably, but need not necessarily, also include a needle member engaging the exit portion of the second polymer nozzle and/or extending out from the tip aperture of the second polymer nozzle. The needle member may preferably, but need not necessarily, be shaped to define an internal needle channel and/or a needle tip aperture. The polymer stream may preferably, but need not necessarily, operatively flow from the tip aperture of the exit portion of the second polymer nozzle through the needle channel, and/or out from the needle tip aperture towards the chamber.

According to an aspect of one preferred embodiment of the invention, the second polymer nozzle may preferably, but need not necessarily, be adapted to operatively further reduce the cross-sectional profile of the polymer stream during passage therethrough.

According to an aspect of one preferred embodiment of the invention, the flow focusing body may preferably, but need not necessarily, be shaped to define a polymer supply opening leading to the chamber. The polymer supply subassembly may preferably, but need not necessarily, securely engage the flow focusing body. At least part of the polymer supply subassembly may preferably, but need not necessarily, be securely received within the polymer supply opening. The polymer stream may preferably, but need not necessarily, operatively flow from the polymer supply subassembly into the chamber.

According to an aspect of one preferred embodiment of the invention, the flow focusing apparatus may preferably, but need not necessarily, also include a focusing fluid supply nozzle. The focusing fluid supply nozzle may preferably, but need not necessarily, have an entry portion shaped to define an entry opening, an exit portion shaped to define a tip aperture, and/or a neck portion shaped to define an internal channel running between the entry opening of the focusing fluid supply nozzle and the tip aperture of the focusing fluid supply nozzle. A focusing stream of the focusing fluid may preferably, but need not necessarily, operatively flow into the entry opening of the focusing fluid supply nozzle, through the internal channel of the focusing fluid supply nozzle, and/or out from the tip aperture of the focusing fluid supply nozzle towards the chamber. The focusing fluid supply nozzle may preferably, but need not necessarily, be adapted to operatively reduce a cross-sectional profile of the focusing stream during passage therethrough.

According to an aspect of one preferred embodiment of the invention, the flow focusing body may preferably, but need not necessarily, be shaped to define a focusing fluid supply opening leading to the chamber. The focusing fluid supply nozzle may preferably, but need not necessarily, securely engage the flow focusing body. At least the exit portion of the focusing fluid supply nozzle may preferably, but need not necessarily, be securely received within the focusing fluid supply opening. The focusing fluid stream may preferably, but need not necessarily, operatively flow from the tip aperture of the focusing fluid supply nozzle into the chamber.

According to an aspect of one preferred embodiment of the invention, the system may preferably, but need not necessarily, also include a fluid bath and a receptacle containing the fluid bath to operatively collect the microbeads, preferably after detachment from the leading end portion of the single flow stream.

According to an aspect of one preferred embodiment of the invention, the fluid bath may preferably, but need not necessarily, contain the focusing fluid.

According to an aspect of one preferred embodiment of the invention, the solvent may preferably, but need not necessarily, include an organic solvent.

According to an aspect of one preferred embodiment of the invention, the organic solvent may preferably, but need not necessarily, include chloroform and/or dichloromethane.

According to an aspect of one preferred embodiment of the invention, the polymer may preferably, but need not necessarily, be substantially hydrophobic.

According to an aspect of one preferred embodiment of the invention, the polymer may preferably, but need not necessarily, include a polystyrene powder and/or a derivative thereof.

According to an aspect of one preferred embodiment of the invention, the polymer may preferably, but need not necessarily, include a polystyrene-acid anhydride copolymer.

According to an aspect of one preferred embodiment of the invention, the polystyrene-acid anhydride copolymer may preferably, but need not necessarily, include a polystyrene-maleic anhydride copolymer.

According to an aspect of one preferred embodiment of the invention, in the polymer solution, the functional groups may preferably, but need not necessarily, be protected before operative reaction of the focusing fluid with the polymer solution. The functional groups may preferably, but need not necessarily, be deprotected following operative reaction of the focusing fluid with the polymer solution.

According to an aspect of one preferred embodiment of the invention, the functional groups may preferably, but need not necessarily, include carboxylic acid groups—preferably at least following operative reaction of the focusing fluid with the polymer solution.

According to an aspect of one preferred embodiment of the invention, in the polymer solution, the carboxylic acid groups may preferably, but need not necessarily, be protected before operative reaction of the focusing fluid with the polymer solution. The carboxylic acid groups may preferably, but need not necessarily, be deprotected following operative reaction of the focusing fluid with the polymer solution.

According to an aspect of one preferred embodiment of the invention, the focusing fluid may preferably, but need not necessarily, include water. The carboxylic acid groups may preferably, but need not necessarily, be deprotected by hydrolysis with the water.

According to an aspect of one preferred embodiment of the invention, the focusing fluid may preferably, but need not necessarily, include water.

According to an aspect of one preferred embodiment of the invention, the particles may preferably, but need not necessarily, include fluorophores.

According to an aspect of one preferred embodiment of the invention, the particles may preferably, but need not necessarily, include nanoparticles.

According to an aspect of one preferred embodiment of the invention, the nanoparticles may preferably, but need not necessarily, include semiconductor nanoparticles, magnetic nanoparticles, metallic conductor nanoparticles, metal oxide nanoparticles, and/or fluorescent nanoparticles.

According to an aspect of one preferred embodiment of the invention, the particles may preferably, but need not necessarily, include quantum dots.

According to an aspect of one preferred embodiment of the invention, the polymer solution may preferably, but need not necessarily, include a combination of one or more types of the quantum dots. The identifiable set of the quantum dots bound by each of the microbeads may preferably, but need not necessarily, be adapted to, following irradiation, produce one or more identifiable spectral signals based on color and/or intensity.

According to an aspect of one preferred embodiment of the invention, the particles may preferably, but need not necessarily, include a combination of quantum dots and magnetic nanoparticles.

According to an aspect of one preferred embodiment of the invention, the flow focusing apparatus further may preferably, but need not necessarily, also include a focusing gate shaped to define a focusing orifice therethrough. The focusing gate may preferably, but need not necessarily, substantially obstruct the exit opening of the flow focusing body. The focusing orifice may preferably, but need not necessarily, lead out from the chamber. The single flow stream may preferably, but need not necessarily, operatively flow out from the chamber through the focusing orifice. The single flow stream may preferably, but need not necessarily, operatively flow out from the focusing orifice.

According to an aspect of one preferred embodiment of the invention, the focusing fluid may preferably, but need not necessarily, substantially surround the polymer stream as the single flow stream flows through, and/or out from, the focusing orifice.

According to an aspect of one preferred embodiment of the invention, a wet diameter ($d_g$) of each of the microbeads may preferably, but need not necessarily, be directly dependent upon a diameter of the polymer stream exiting the focusing orifice.

According to an aspect of one preferred embodiment of the invention, the wet diameter ($d_g$) of each of the microbeads may preferably, but need not necessarily, be determined according to the following equation:

$$d_g = 1.89 d_j$$

wherein $d_j$ may preferably be the diameter of the polymer stream exiting the focusing orifice.

According to an aspect of one preferred embodiment of the invention, a diameter ($d_j$) of the polymer stream flowing out from the focusing orifice may preferably, but need not necessarily, be dependent upon: a diameter of the focusing orifice as the polymer stream exits therefrom; a density and/or a flow rate of the polymer solution entering the chamber; and/or a density and/or a flow rate of the focusing fluid entering the chamber.

According to an aspect of one preferred embodiment of the invention, the diameter ($d_j$) of the polymer stream flowing out from the focusing orifice may preferably, but need not necessarily, be determined according to the following equation:

$$d_j = D\left[1 + \left(\frac{\rho_2}{\rho_1}\right)^{1/2}\left(\frac{Q_2}{Q_1}\right)\right]^{-1/2}$$

wherein D may preferably be the diameter of the focusing orifice as the polymer stream exits therefrom, $\rho_2$ may preferably be the density of the focusing fluid entering the chamber, $\rho_1$ may preferably be the density of the polymer solution entering the chamber, $Q_2$ may preferably be the flow rate of the focusing fluid entering the chamber, and $Q_1$ may preferably be the flow rate of the polymer solution entering the chamber.

According to an aspect of one preferred embodiment of the invention, a wet diameter ($d_g$) of each of the microbeads may preferably, but need not necessarily, be directly dependent upon a diameter ($d_j$) of the polymer stream exiting the focusing orifice. The wet diameter ($d_g$) of each of the microbeads may preferably, but need not necessarily, be determined according to the following equation:

$$d_g = 1.89 d_j$$

The density ($\rho_1$) of the polymer solution entering the chamber, the density ($\rho_2$) of the focusing fluid entering the chamber, and/or the diameter (D) of the focusing orifice as the polymer exits therefrom, may preferably, but need not necessarily, be predetermined. When the flow rate ($Q_1$) of the polymer solution flowing into the chamber is about 1 milliliter per hour (mL/h) and the flow rate ($Q_2$) of the focusing fluid flowing into the chamber is about 180 milliliters per hour (mL/h), the system may preferably, but need not necessarily, form microbeads about 6 micrometers (μm) in diameter.

According to an aspect of one preferred embodiment of the invention, a wet diameter ($d_g$) of each of the microbeads may preferably, but need not necessarily, be directly dependent upon a diameter ($d_j$) of the polymer stream exiting the focusing orifice. The wet diameter ($d_g$) of each of the microbeads may preferably, but need not necessarily, be determined according to the following equation:

$$d_g = 1.89 d_j$$

The density ($\rho_1$) of the polymer solution entering the chamber, the density ($\rho_2$) of the focusing fluid entering the chamber, and/or the diameter (D) of the focusing orifice as the polymer exits therefrom, may preferably, but need not necessarily, be predetermined. When the flow rate ($Q_1$) of the polymer solution flowing into the chamber is about 0.5 milliliters per hour (mL/h) and the flow rate ($Q_2$) of the focusing fluid flowing into the chamber is about 180 milliliters per hour (mL/h), the system may preferably, but need not necessarily, form microbeads about 5 micrometers (μm) in diameter.

According to an aspect of one preferred embodiment of the invention, the polymer solution may preferably, but need not necessarily, have a concentration of about 0.04 by weight-weight percentage (4 wt %).

According to the invention, there is also disclosed a microbead formed according to any of the foregoing methods and/or systems.

According to an aspect of one preferred embodiment of the invention, the microbead may preferably, but need not necessarily, be adapted to operatively bind with antibodies or antigens as the biorecognition molecules.

According to an aspect of one preferred embodiment of the invention, the microbead (operatively bound with the antibodies or antigens) may preferably, but need not necessarily, be adapted for use as a probe in a multiplexed diagnostic test for detection of one or more diseases.

According to an aspect of one preferred embodiment of the invention, the diseases may preferably, but need not necessarily, be HIV, Hepatitis B, Hepatitis C, malaria, Dengue virus, and/or avian flu (H5N1).

According to an aspect of one preferred embodiment of the invention, the microbead (operatively bound with the biorecognition molecules) may preferably, but need not necessarily, be adapted for use as a probe in a multiplexed diagnostic test for detection of one or more genetic expression factors.

Other advantages, features and/or characteristics of the present invention, as well as methods of operation and/or functions of the related elements of the method and system, and/or the combination of steps, parts and/or economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the system and method according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
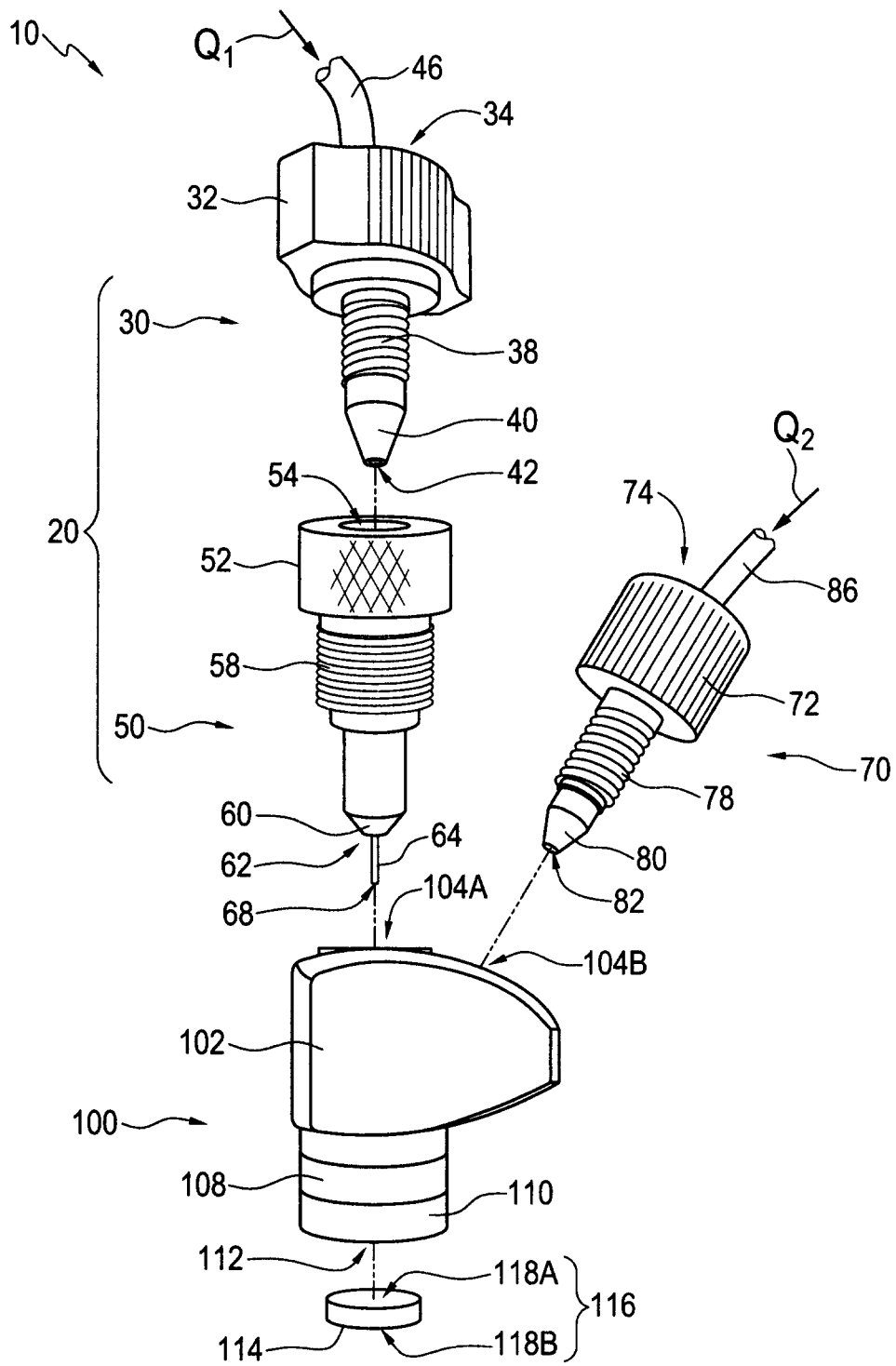
FIG. 1 is an exploded front view of a flow focusing apparatus of a system for forming microbeads according to a preferred embodiment of the present invention.
Figure 2:
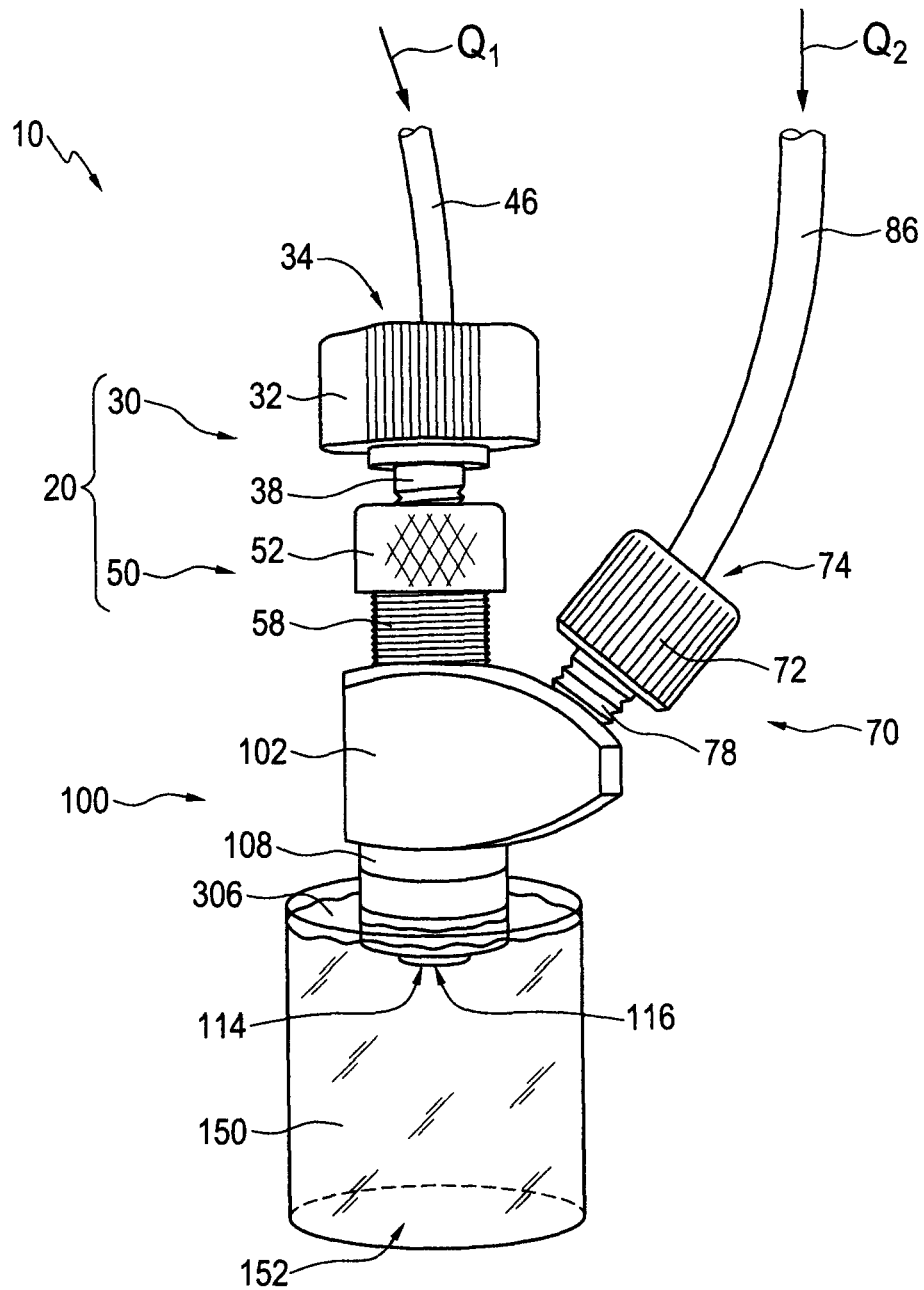
FIG. 2 is a fully assembled front view of the flow focusing apparatus, in use with a fluid bath and a receptacle, of the system shown in FIG. 1.
Figure 3:
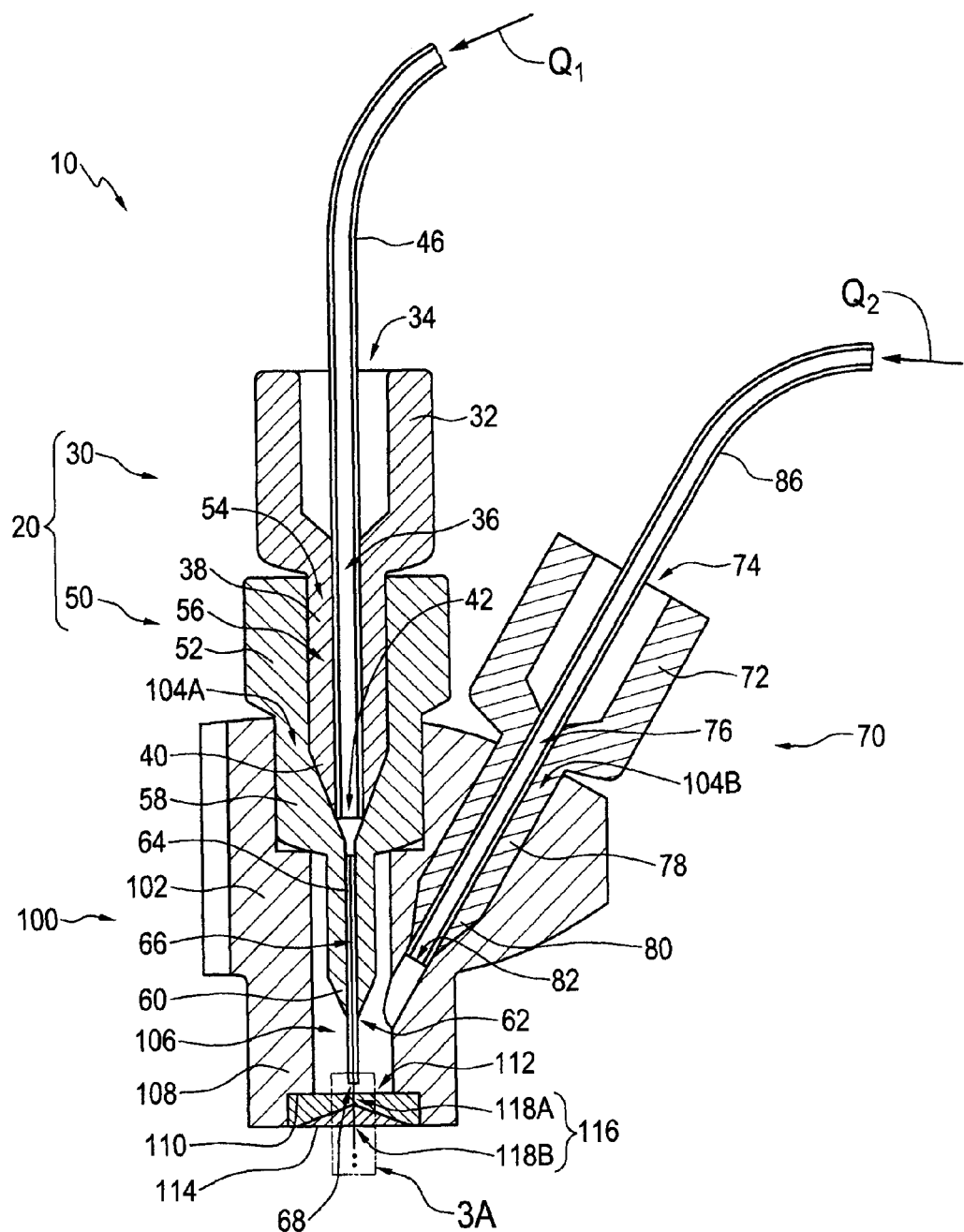
FIG. 3 is a schematic sectional front view of the flow focusing apparatus shown in FIG. 1, showing area 3A in phantom outline.
Figure 3A:
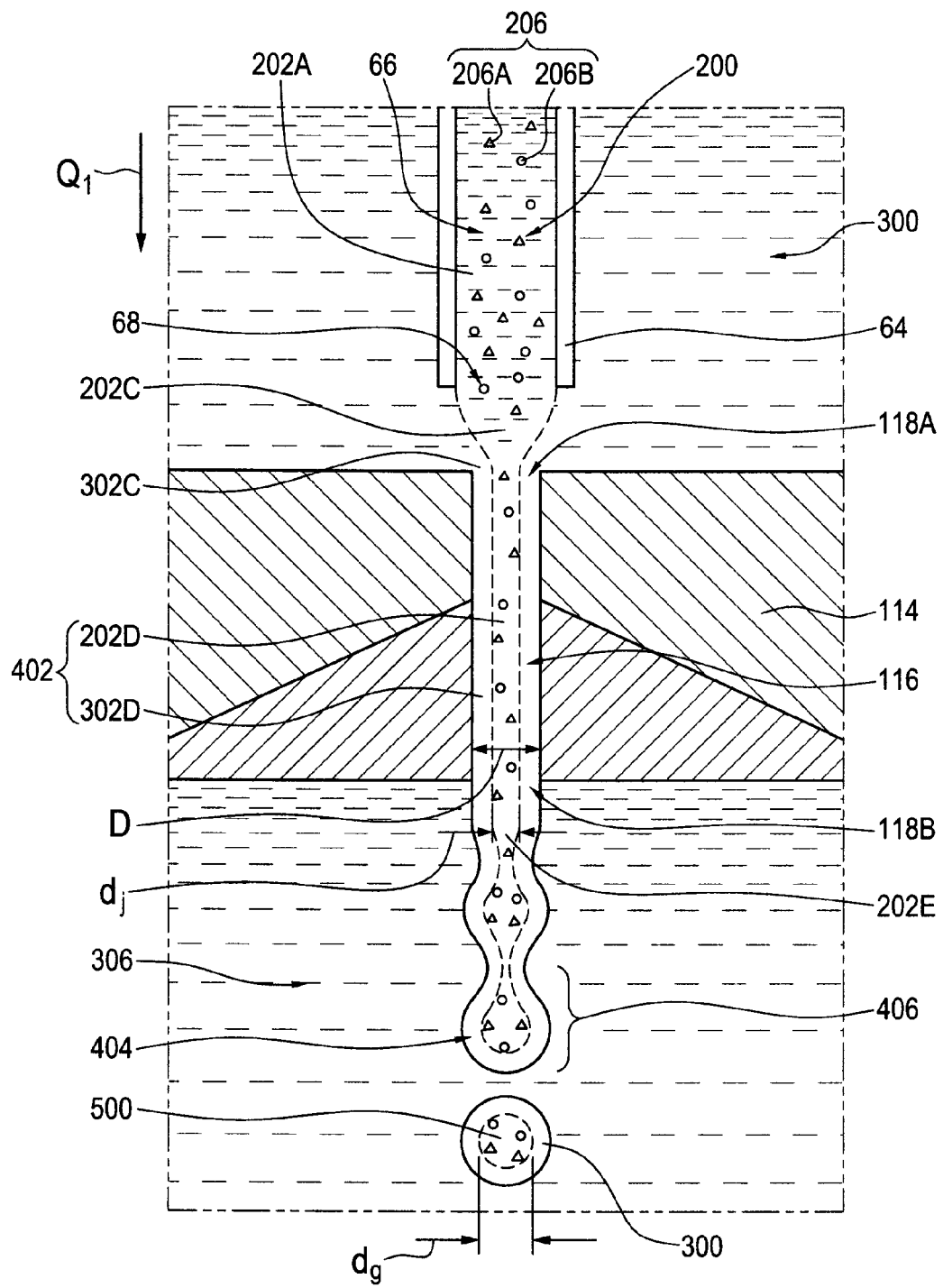
FIG. 3A is an enlarged view of area 3A from FIG. 3.

Referring now to FIGS. 1-3A of the drawings, there is shown a flow focusing apparatus 10 used in a preferred embodiment of a system according to the present invention. As best seen in FIG. 2, the flow focusing apparatus 10 includes a polymer supply tube 46, a polymer supply subassembly 20, a focusing fluid supply tube 86, a focusing fluid supply nozzle 70, a flow focusing body 100, a focusing gate 114, and a receptacle 150. Preferably, the system also includes a polymer solution 200, a focusing fluid 300 (capable of reacting with the polymer solution 200), and a fluid bath 306, as best seen in FIG. 3A and as will be described in considerably greater detail hereinbelow.

As best seen in FIG. 1, the polymer supply subassembly 20 preferably includes first and second polymer nozzles, 30 and 50 respectively.

The first polymer nozzle 30 includes an entry portion 32, a neck portion 38, and an exit portion 40. The entry portion 32 of the first polymer nozzle 30 is shaped to define an entry opening 34 (as best seen in FIG. 3). As best seen in FIGS. 1 and 2, the entry portion (alternately referred to as "grip member") 32 is preferably also adapted to serve as a grip for the first polymer nozzle 30.

The exit portion 40 of the first polymer nozzle 30 is shaped to define a tip aperture 42 (as best seen in FIGS. 1 and 3), and the neck portion 38 is shaped to define an internal channel 36 running between the entry opening 34 and the tip aperture 42 of the first polymer nozzle 30 (as shown in FIG. 3). Preferably, the polymer supply tube 46 extends through the entry opening 34 of the first polymer nozzle 30. From there, the polymer supply tube 46 extends into the internal channel 36, to substantially adjacent to the tip aperture 42, of the first polymer nozzle 30.

The second polymer nozzle 50 is preferably connected in series after the first polymer nozzle 30. The second polymer nozzle 50 includes an entry portion 52 shaped to define an entry opening 54 (as best seen in FIG. 1). The entry portion 52 may also serve as a grip for the second polymer nozzle 50 (such that the entry portion 52 may interchangeably be referred to as grip member 52).

The second polymer nozzle 50 also includes an exit portion 60 shaped to define a tip aperture 62 (as best seen in FIGS. 1 and 3), and a neck portion 58 shaped to define an internal channel 56 running between the entry opening 54 and the tip aperture 62 of the second polymer nozzle 50 (as shown in FIG. 3).

The second polymer nozzle 50 additionally includes a needle member 64 engaging the exit portion 60, and extending out from the tip aperture 62, of the second polymer nozzle 50. The needle member 64 is shaped to define an internal needle channel 66 and a needle tip aperture 68.

Preferably, the neck portion 38 and the exit portion 40 of the first polymer nozzle 30 extend through the entry opening 54 of the second polymer nozzle 50. From there, the exit portion 40 of the first polymer nozzle 30 extends into the internal channel 56, to substantially adjacent to the needle member 64, of the second polymer nozzle 50 (as shown in FIG. 3).

As best seen in FIG. 1, the neck portion 38 of the first polymer nozzle 30 is preferably threaded (such that it is alternately referred to as threaded portion 38 of the first polymer nozzle 30). As may be best appreciated from FIGS. 1 and 2, the entry portion 52 of the second polymer nozzle 50 may preferably be provided with corresponding threads (not shown) adjacent to the entry opening 54, so as to threadingly mate with the threaded portion 38 of the first polymer nozzle 30, and such that the first and second polymer nozzles, 30 and 50, securely engage one another (as shown in FIG. 2).

The flow focusing body 100 includes an entry portion 102, a neck portion 108 and an exit portion 110. The entry portion 102 is shaped to define a polymer supply opening 104A and a focusing fluid supply opening 104B. The exit portion 110 is shaped to define an exit opening 112. The entry portion 102 and the neck portion 108 are preferably together shaped to define an interior chamber 106 that extends between the polymer supply opening 104A, the focusing fluid supply opening 104B, and the exit opening 112.

Preferably, the neck portion 58, the exit portion 60 and the needle member 64 of the second polymer nozzle 50 extend through the polymer supply opening 104A of the flow focusing body 100. From there, the needle member 64 of the second polymer nozzle 50 extends into the interior chamber 106, to substantially adjacent to the exit opening 112, of the flow focusing body 100 (as shown in FIG. 3).

As best seen in FIG. 1, the neck portion 58 of the second polymer nozzle 50 is preferably threaded (such that it is alternately referred to as threaded portion 58 of the second polymer nozzle 50). As may be best appreciated from FIGS. 1 and 2, the entry portion 102 of the flow focusing body 100 may preferably be provided with corresponding threads (not shown) adjacent to the polymer supply opening 104A, so as to threadingly mate with the threaded portion 58 of the second polymer nozzle 50, and such that the polymer supply subassembly 20 securely engages the flow focusing body 100 (as shown in FIG. 2).

The focusing fluid supply nozzle 70 includes an entry portion 72, a neck portion 78, and an exit portion 80. The entry portion 72 of the focusing fluid supply nozzle 70 is shaped to define an entry opening 74 (as best seen in FIG. 3). As best seen in FIGS. 1 and 2, the entry portion (alternately referred to as "grip member") 72 is preferably also adapted to serve as a grip for the focusing fluid supply nozzle 70.

The exit portion 80 of the focusing fluid supply nozzle 70 is shaped to define a tip aperture 82 (as best seen in FIGS. 1 and 3), and the neck portion 78 is shaped to define an internal channel 76 running between the entry opening 74 and the tip aperture 82 of the focusing fluid supply nozzle 70 (as shown in FIG. 3). Preferably, the focusing fluid supply tube 86 extends through the entry opening 74 of the focusing fluid supply nozzle 70. From there, the focusing fluid supply tube 86 extends into the internal channel 76, to substantially adjacent to the tip aperture 82, of the focusing fluid supply nozzle 70.

Preferably, the neck portion 78 and the exit portion 80 of the focusing fluid supply nozzle 70 extend through the focusing fluid supply opening 104B of the flow focusing body 100. From there, the exit portion 80 of the focusing fluid supply nozzle 70 extends into the interior chamber 106, to substantially adjacent to the exit opening 112, of the flow focusing body 100 (as shown in FIG. 3).

As best seen in FIG. 1, the neck portion 78 of the focusing fluid supply nozzle 70 is preferably threaded (such that it is alternately referred to as threaded portion 78 of the focusing fluid supply nozzle 70). As may be best appreciated from FIGS. 1 and 2, the entry portion 102 of the flow focusing body 100 may preferably be provided with corresponding threads (not shown) adjacent to the focusing fluid supply opening 104B, so as to threadingly mate with the threaded portion 78 of the focusing fluid supply nozzle 70, and such that the focusing fluid supply nozzle 70 securely engages the flow focusing body 100 (as shown in FIG. 2).

The focusing gate 114 is preferably shaped to define a focusing orifice 116 therethrough. The focusing gate 114 substantially obstructs the exit opening 112 of the flow focusing body 100. The focusing orifice 116 preferably leads out from the interior chamber 106 of the flow focusing body 100. The focusing orifice 116 includes an orifice entry end portion 118A and an orifice exit portion 118B.

Reference will now be made, briefly, to a method of forming QD-doped polymer microbeads, using the flow focusing apparatus 10, according to a preferred embodiment of the present invention. It should, of course, be appreciated that, according to the present invention, the below-described methods may be employed independent of the flow focusing apparatus 10 described hereinabove.

Now, the method preferably includes a preliminary step, a first polymer narrowing step, a second polymer narrowing step, a focusing fluid narrowing step, step (a), step (b), step (c), step (d), step (e), step (f) [after step (e)], and step (g) [after step (e)].

Figure 4:
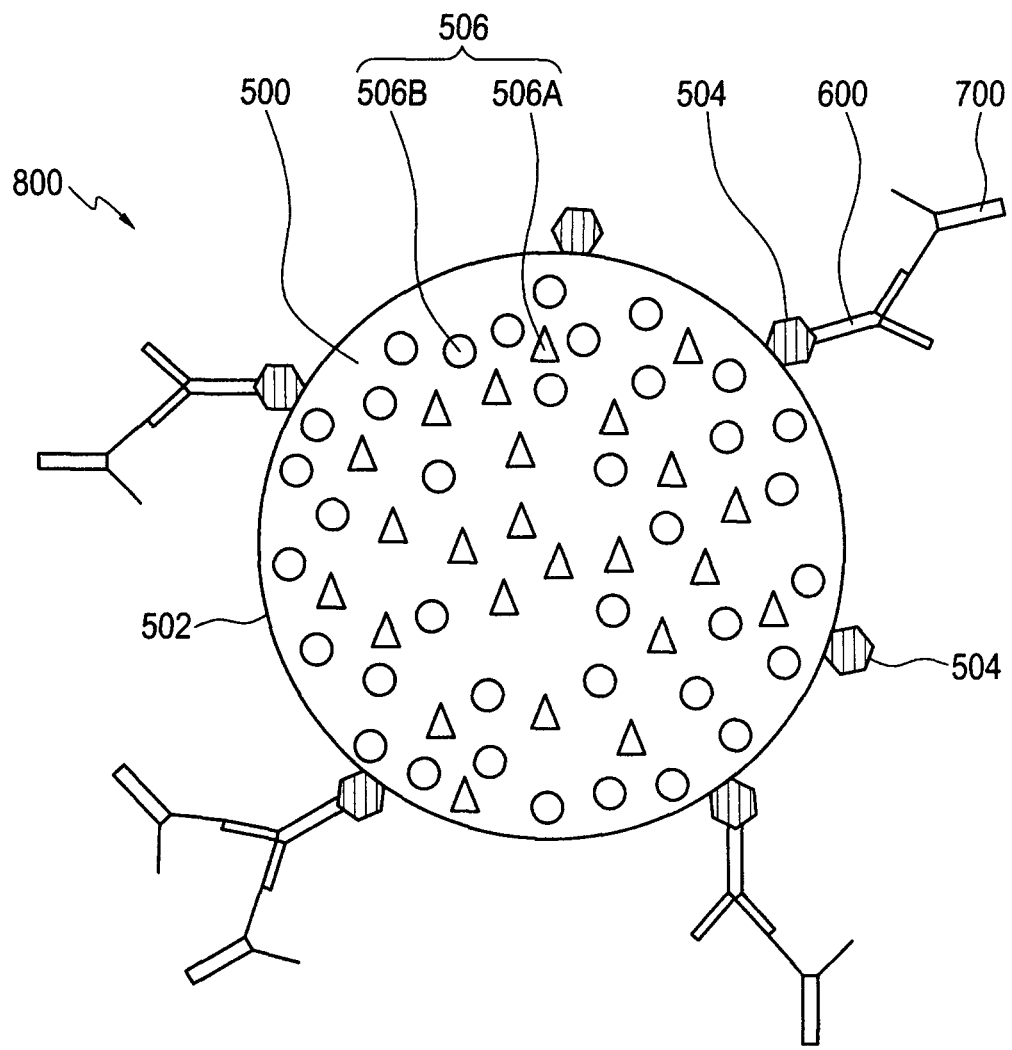
FIG. 4 is an illustrative representation of a conjugated and bound microbead according to a preferred embodiment of the present invention.

In the preliminary step, quantum dots 506 may be selected for incorporation into polymer microbeads 500 (as best seen in FIG. 4), so as to create a specific and identifiable barcode. The specific barcode, color code and/or emission profile may preferably be created by predetermining which differently sized QDs 506A, 506B are to be incorporated inside the microbeads 500. (It may be worthwhile to note, as an aside, that reference numerals 506, 506A and 506B may generally denote the QDs in the microbeads 500—i.e., after being incorporated from the polymer solution 200.) Since the sizes of the different QDs 506A, 506B will be directly related to their individual fluorescence spectra, specific combinations can be selected. Different combinations of the QDs 506A, 506B encapsulated within microbeads 500 will typically provide a characteristic and readily identifiable emission profile.

In addition, and/or as an alternative, to choosing a color profile and/or barcode, fluorescence intensity can be used to distinguish different detection signals. When two or more QD-coded microbeads 500 emit substantially the same spectrum, a concentration of the QDs 506 inside the microbead 500 can be tuned to create fluorescence signals of varying intensity. In cases where barcoding is accomplished by intensity alone (not shown), the differences in intensity between various microbeads may preferably be greater than a measurement error that may typically be associated with fluorescence peak intensity.

Following design of a barcode, the microbeads may preferably be manufactured as set out herein.

Still in the preliminary step, however, the QDs 206 are preferably first dissolved in a suitable organic solvent such as chloroform or dichloromethane to form two different QD-colored solutions. The desired QD-colored solutions are then mixed in the appropriate ratios to generate the desired barcode emission spectrum. For example, in making the polymer solution 200 depicted in FIG. 3A, two different QD-colored solutions may have been initially mixed, each including a different type of the QDs 206A, 206B. (It may be worthwhile to note, as an aside, that reference numerals 206, 206A and 206B may generally denote the QDs in the polymer solution 200—i.e., prior to incorporation in any microbeads 500.) Thereafter, a polymer powder (such as a polystyrene powder and/or one or more derivatives thereof) is preferably dissolved into the combined QD solution to create the finished polymer solution 200. The amount of polymer added to the polymer solution 200 can be varied depending upon the diameter of the desired microbead 500.

Also in the preliminary step, the focusing fluid will preferably be selected for its ability to react with the polymer solution. According to one preferred embodiment of the invention, the focusing fluid is water. In this regard, it is important for the preferred focusing fluid 300 (i.e., water) to be capable of reacting with the polymer solution 200 in the polymer stream 202A, after step (b), to form one or more functional groups 504 which are adapted to bind with biorecognition molecules 600.

The QD-doped polymer microbeads 500 made using the flow focusing manufacturing process according to the present invention are intended for use as probes in multiplexed diagnostic tests for various diseases, including malaria, HIV, hepatitis B, hepatitis C, dengue fever, and/or avian flu (H5N1). The surfaces 502 of the barcoded microbeads 500 must be functionalized to bind with the necessary BRMs 600. For the purposes of the present invention, the desired BRMs 600 may include antibodies, antigens, nucleotide sequences, DNA/RNA fragments, and molecules capable of binding with poisons and/or toxins (i.e., to the extent that such poisons and/or toxins may be present in biological systems, such as, for example, in ecosystems). Previously, barcoded microbeads 500 may have been first synthesized (i.e., using techniques other than flow focusing) and, then, the surfaces 502 of the microbeads may have been functionalized by adding carboxylate functional groups thereto. The presence of these carboxylate functional groups may have allowed the primary amine of the BRMs 600 to covalently bind to the surface 502 of the microbeads 500, through the use of a coupling agent such as EDC (1-ethyl-3-(3-dimethylamino propyl)carbodiimide). Using the methods and systems according to the present invention, however, this extra post-formation functionalization step can be eliminated.

In the preliminary step, the polymer solution 200 may preferably be prepared so as to contain, inter alia, a polymer whose structure already includes carboxylic acid groups 504. Accordingly, the microbeads 500 generated from such a polymer may be doped with QDs, and may already carry the carboxylic acid groups 504 on their surface 502, ready for conjugation to the BRMs 600.

Next, in the first polymer narrowing step, and as may be best appreciated from FIGS. 1 and 3, the polymer solution 200 flows in a polymer stream 202A through the polymer supply tube 46, and through the entry opening 34 and the internal channel 36 of the first polymer nozzle 30. Therefrom, the polymer stream 202A flows out from the tip aperture 42 in the general direction of the interior chamber 106.

In the first polymer narrowing step, and as may be best appreciated from FIG. 1, a cross-sectional profile of the polymer stream 202A is reduced during passage through the first polymer nozzle 30. Alternately, the cross-sectional profile of the polymer stream 202A may be reduced after passage out from the first polymer nozzle 30 (e.g., such as might be appreciated from a consideration of FIG. 3).

In the second polymer narrowing step, and as may be best appreciated from FIGS. 1 and 3, the polymer stream 202A flows through the internal channel 56 and the needle channel 66 of the second polymer nozzle 50. In the second polymer narrowing step, and as may be best appreciated from FIGS. 1 and 3, the cross-sectional profile of the polymer stream 202A is further reduced during passage through the second polymer nozzle 50. Thereafter, the polymer stream 202A flows out from the needle tip aperture 68 into the interior chamber 106.

The first and second polymer narrowing steps are preferably performed before step (a). The focusing fluid narrowing step is preferably performed before step (b).

In the focusing fluid narrowing step, and as may be best appreciated from FIGS. 1 and 3, the focusing fluid 300 flows in a focusing fluid stream through the focusing fluid supply tube 86, and through the entry opening 74 and the internal channel 76 of the focusing fluid supply nozzle 70. Therefrom, the focusing stream flows out from the tip aperture 82 into the interior chamber 106. In the focusing fluid narrowing step, and as may be best appreciated from FIG. 1, a cross-sectional profile of the focusing fluid stream is reduced during passage through the focusing fluid supply nozzle 70.

FIG. 3A depicts the polymer solution 200 and the focusing fluid 300 in passage through various stages in the polymer stream 202A, 202C, 202D, 202E and the fluid focusing stream 302C, 302D, respectively.

In step (a), and with reference to FIG. 3A, the polymer stream 202A flows into the interior chamber 106 of the flow focusing body 100 through the needle tip aperture 68 of the second polymer nozzle 50. According to some preferred embodiments of the invention, and as shown in FIG. 3A, the polymer stream 202A may preferably contain a combination of two different types of the quantum dots 206A, 206B.

Preferably, step (b) is performed substantially contemporaneous with step (a). In step (b), the focusing fluid 300 flows out from the focusing fluid supply nozzle 70 into the interior chamber 106 (as may be best appreciated from FIG. 3).

In step (c), the focusing fluid 300 in the focusing stream 302C is directed into contact with the polymer stream 202C in the interior chamber 106 of the focusing body 100, so as to focus the polymer stream 202C toward the orifice entry end portion 118A of the focusing orifice 116.

Then, in step (d), the focusing fluid 300 (in the focusing stream 302D) and the polymer stream 202D focused thereby flow, as a single flow stream 402, out from the interior chamber 106 and into the orifice entry end portion 118A of the focusing orifice 116.

At that point, the focusing stream 302D substantially surrounds the polymer stream 202D in the single flow stream 402. The single flow stream 402 then flows, within the focusing orifice 116, towards the orifice exit end portion 118B.

In step (e), the single flow stream 402 flows out from the orifice exit end portion 118B of the focusing orifice 116. Pendant droplets 406 detach from a leading end portion 404 of the single flow stream 402, so as to form the microbeads 500 (still wet) which are surrounded by the focusing liquid 300.

In step (f), and as may be best appreciated from FIG. 2, the microbeads 500 are collected upon a bottom portion 152 of the receptacle 150 containing the fluid bath 306. Subsequently, the microbeads 500 are solidified and/or dried. In a preferred embodiment according to the present invention, and as best seen in FIGS. 2 and 3A, the focusing orifice 116 is immersed in the fluid bath 306. Preferably, the fluid bath 306 also contains the focusing fluid 300—i.e., preferably, a water solution. The fluid bath 306 may preferably be maintained under stirring conditions (not shown) for the duration of the process of solidifying the microbeads 500.

In step (g), the microbeads 500 may be allowed to further solidify before being recovered from the fluid bath 306. In one embodiment according to the present invention, the microbeads 500 may be collected and/or recovered by centrifugation (not shown).

The diameter ($d_g$) of the wet microbeads 500 (i.e., as shown in FIG. 3A) produced according to the present invention can give valuable information about the size of the resulting microbead 500 once it is dry. See, for example, L. Martín-Banderas et al., *Adv. Mater.* 2006, 18, 559-564, and A. M. Ganan-Calvo, *Physical Review Letters* 1998, 80(2), 285. The diameter ($d_g$) of the wet microbeads 500 does not lead directly to an actual diameter for the dry bead. Though perhaps not essential to the working of the present invention, it may be generally believed that the dry microbead diameter is related to the wet microbead diameter ($d_g$) as follows: dry microbead diameter=$d_g$*(wt %/polymer density)$^{1/3}$. For example, using the foregoing relationship, for a polystyrene that is provided at a density of 1.05 and a weight-weight percentage (wt %) of 4% (or 0.04), the dry microbead diameter will be about ⅓ of the wet microbead diameter ($d_g$). In such a situation, therefore, the diameter of the dry microbead 500 will always be smaller than the diameter ($d_g$) of the wet microbead 500 (shown in FIG. 3A). The wet microbead diameter ($d_g$) is believed to provide an upper limit for the size of the dry microbead 500.

The wet diameter ($d_g$) of each of the microbeads 500 is preferably directly dependent upon a diameter ($d_j$) of the polymer stream 202E in step (e). The wet diameter ($d_g$) of the microbeads 500 is determined according to the following equation:

$$d_g = 1.89 d_j$$

The diameter ($d_j$) of the polymer stream 202E in step (e) is dependent upon: a diameter (D) of the focusing orifice 116 in step (e); a density ($\rho_1$) and a flow rate ($Q_1$) of the polymer stream 202A in step (a); and a density ($\rho_2$) and a flow rate ($Q_2$) of the focusing fluid 300 in step (b).

Accordingly, the diameter ($d_j$) of the polymer stream 202E in step (e) is determined according to the following equation:

$$d_j D \left[ 1 + \left(\frac{\rho_2}{\rho_1}\right)^{1/2} \left(\frac{Q_2}{Q_1}\right) \right]^{-1/2}$$

All else being constant, changing the flow rates $Q_2$ and $Q_1$ has a direct impact on the size of the polymer stream 202E and consequently on the wet diameter ($d_g$) of the microbeads 500.

Once $Q_2$ and $Q_1$ have been optimized for the desired microbead wet diameter ($d_g$), increased productivity (i.e., number of beads per time unit) can be achieved by keeping the ratio $Q_2/Q_1$ constant and increasing the values of $Q_2$ and $Q_1$ accordingly. For example, if the required flow rates are $Q_2$=180 mL/h and $Q_1$=1 mL/h, the ratio $Q_2/Q_1$ has a value of 180. To increase productivity, both $Q_2$ and $Q_1$ will preferably increase so that the value of $Q_2/Q_1$ remains fixed at 180.

The following equations highlight certain other parameters that may, in turn, influence the focusing fluid flow rate $Q_1$ and polymer stream flow rate $Q_2$:

$$Q_2 = \left(\frac{1.89 W e \sigma}{8 \rho_2 d_g}\right)^{1/2} \pi \left[ D^2 - \left(\frac{d_g}{1.89}\right)^2 \right]$$

$$Q_1 = Q_2 \left(\frac{\rho_2}{\rho_1}\right)^{1/2} \left[ \left(1.89 \frac{D}{d_g}\right)^2 - 1 \right]^{-1}$$

wherein We is Weber number,
$\rho_2$ is the density of the focusing fluid in step (b),
$\rho_1$ is the density of the polymer solution in step (a),
$\sigma$ is interfacial tension between polymer stream and focusing fluid,
D is the diameter of the exit orifice in step (e), and
$d_g$ is the wet diameter of the microbeads The Weber number We is further defined in the following equation, wherein $V_2$ is the velocity of the focusing fluid 300 and the other terms are as previously defined:

$$We = \left(\frac{\rho_2 V_2^2 d_j}{2\sigma}\right)$$

The velocity ($V_2$) of the focusing fluid 300 is related to $Q_2$ according to the equation provided below:

$$V_2 = \frac{4 Q_2}{\pi (D^2 - d_j^2)}$$

Manufacturing polymer microbeads 500 of a particular diameter using the flow focusing technique described herein may preferably require that several parameters be taken into consideration. These parameters may preferably include one or more of the following: (i) flow rate, (ii) polymer concentration, (iii) type of polymer, and (vi) polymer solvent (focusing phase). Each of these parameters may be addressed in more detail below.

As described previously, the rate $Q_1$ at which the polymer stream 202A [in step (a)] and the rate $Q_2$ at which the focusing fluid 300 [in step (b)] are introduced into the interior chamber 106 of the flow focusing body 100 is critical. These rates impact the diameter $d_j$ of the polymer stream 202E in step (e). In one embodiment of the invention, the polymer solution 200 is introduced from the polymer supply subassembly 20 at a rate of 1 mL/h and the focusing fluid 300 (i.e., water) is introduced at a rate of 180 mL/h to produce beads of 6 microns in diameter. When 0.5 mL/h and 180 mL/h, respectively, are used, 5 micron beads are obtained. The flow rates of the polymer solution 200 and the focusing fluid 300 may preferably be adjusted to create microbeads 500 of a desired size and production rate.

The concentration of the polymer used in the polymer solution 200, as well as the type of polymer used, has an impact on how much the wet diameter ($d_g$) decreases as a wet microbead 500 dries and becomes solid. The polymer solution may preferably be formed with a concentration of about 0.04 by weight-weight percentage (4 wt %). It may be believed, though it is not essential to the working of the present invention, that the higher the concentration and the molecular weight of the polymer, the larger the microbead diameter.

The rate at which the microbeads 500 dry (which itself is dependent on the vapor pressure of the polymer stream 202 as well as its solubility into the focusing fluid 300) may have has an important influence upon the final size of the microbead 500 formed relative to the original wet diameter ($d_g$) of the microbead 500, and upon the smoothness of the microbead surface 502. Again, though perhaps not essential to the working of the present invention, it may be generally believed that the larger the solubility and vapor pressure of the polymer stream 202, the larger the resulting microbead size and surface roughness.

Presently preferred embodiments of the method may be described in the examples below.

Example 1

A barcode was designed by mixing QD/chloroform solutions of different colors in appropriate ratios in order to generate the desired barcode emission spectrum of 520 nm, 580 nm and 630 nm with a 1:2:3 ratio. Into the chloroform mixture, commercial poly(styrene-co-maleic anhydride), cumene terminated powder (from Aldrich) (or derivatives) was dissolved to create a 4% polymer solution. The resulting solution was then introduced into a commercial nozzle (Avant-1 from Ingeniatrics) using a syringe pump (SP100I from World Precision Instruments) at a rate of 1 mL/h along with water as a focusing fluid using a digital gear pump (Cole Parmer Instrument Company) at a rate of 180 mL/h. During the reaction, the nozzle was immersed into a water solution under stirring. Beads were hardened by overnight stirring and collected by centrifugation.

Example 2

In this example, the following QD-based barcode was used: 555 nm, 580 nm, 605 nm with a respective intensity ratio of 1:2:1. The solution was made using the same protocol as Example 1 using poly(styrene-co-maleic anhydride).

Example 3

The same protocol was used as in Example 1, however, the QDs were replaced by magnetite nanoparticles (from Ferrotec Corporation) dissolved into chloroform. This example resulted in paramagnetic microbeads that are attracted to a magnet and lose their magnetism upon removal of the magnetic field.

Example 4

Using the same protocol as Example 1, a mixture of QDs and magnetite nanoparticles is formed using a selected ratio of QDs to magnetite. This example results in microbeads that combine the fluorescent properties from Examples 1 and 2 with the paramagnetic properties of Example 3.

Referring to FIG. 4, there is depicted a conjugate 800 including a microbead 500 produced according to a preferred embodiment of the present invention. The microbead 500 contains a set of particles 506—more particularly, a set 506 of two types of quantum dots 506A, 506B—encapsulated within the microbead 500. A surface 502 of the microbead 500 possesses functional groups 504 bound with the biorecognition molecules 600 that are themselves bound to target molecules 700.

The identifiable set 506 of the quantum dots 506A, 506B is adapted to, following irradiation, produce one or more identifiable spectral signals based on color and/or intensity.

Other modifications and alterations may be used in the design and manufacture of other embodiments according to the present invention without departing from the spirit and scope of the invention, which, is limited only by the accompanying claims of this application.

While the above method has been presented in the context of QDs, the method is equally applicable to other nanoparticles. Types of nanoparticles which are capable of being used in conjunction with the method and system according to the present invention may preferably include, but are not limited to, hard nanoparticles, polymer nanoparticles, magnetic nanoparticles, metallic conductor nanoparticles, metal oxide nanoparticles, and fluorescent nanoparticles.

Moreover, while the above method has been presented in the context of polymers which exhibit the structural and solubility requirements for making surface functionalized, QD-doped beads, the method is equally applicable to polymers that are substantially hydrophobic polymers and contain protected carboxylic acid groups that can be deprotected via hydrolysis. Such polymers may be exemplified by polystyrene-acid anhydrides copolymers, and more specifically, by polystyrene-maleic anhydride copolymers. These polymers may be soluble in solvents most suitable for QDs (e.g., dichloromethane and chloroform) and may generate the necessary carboxylic acid groups upon contact with water which, in a preferred embodiment of the invention, is the focusing fluid 300.

The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims.

What is claimed is:

1. A method of forming microbeads comprising the steps of:
   (a) flowing a polymer stream of a polymer solution into an interior chamber of a flow focusing body, with the polymer solution comprising particles and a polymer dissolved in a solvent;
   (b) flowing a focusing fluid into the chamber, with the focusing fluid capable of reacting with the polymer solution to form functional groups adapted to bind with biorecognition molecules;
   (c) directing the focusing fluid into contact with the polymer stream in the chamber, so as to focus the polymer stream;

(d) flowing the focusing fluid and the polymer stream focused thereby, as a single flow stream, out from the chamber; and (e) allowing detachment of pendant droplets from a leading end portion of the single flow stream so as to form the microbeads;

wherein each of the microbeads binds an identifiable set of the particles; and wherein the focusing fluid reacts with the polymer solution to form one or more of the functional groups at a surface of each of the microbeads, such that the microbeads are adapted to bind with the biorecognition molecules.

2. The method according to claim 1, wherein in step (d) the focusing fluid substantially surrounds the polymer stream in the single flow stream.

3. The method according to claim 1, further comprising step (f), after step (e), wherein the microbeads are collected in a receptacle containing a fluid bath.

4. The method according to claim 3, wherein in step (f), the fluid bath is stirred and the microbeads are allowed to solidify.

5. The method according to claim 3, further comprising step (g), after step (e), wherein the microbeads allowed to solidify and are recovered from the fluid bath.

6. The method according to claim 5, wherein in step (g), the microbeads are recovered by centrifugation.

7. The method according to claim 3, wherein the fluid bath contains the focusing fluid.

8. The method according to claim 1, further comprising a preliminary step, before step (a), of forming the polymer solution by dissolving the particles and the polymer in the solvent.

9. The method according to claim 1, further comprising a preliminary step, before step (a), of forming the polymer solution by first dissolving the particles in the solvent, and then dissolving the polymer therein.

10. The method according to claim 1, wherein in step (a), the solvent comprises an organic solvent.

11. The method according to claim 1, wherein in step (a), the polymer is substantially hydrophobic.

12. The method according to claim 1, wherein in step (a), the polymer comprises a polystyrene powder or a derivative thereof.

13. The method according to claim 1, wherein in step (a), the polymer comprises a polystyrene-acid anhydride copolymer.

14. The method according to claim 1, wherein the functional groups are protected in step (a), and wherein the functional groups are deprotected following reaction of the focusing fluid with the polymer solution.

15. The method according to claim 1, wherein the functional groups comprise carboxylic acid groups.

16. The method according to claim 1, wherein the focusing fluid is water.

17. The method according to claim 1, wherein in step (a), the particles comprise fluorophores.

18. The method according to claim 1, wherein in step (a), the particles comprise nanoparticles.

19. The method according to claim 1, wherein in step (a), the particles comprise quantum dots.

20. The method according to claim 19, wherein in step (a), the polymer solution comprises a combination of one or more types of the quantum dots, and wherein the identifiable set of the quantum dots bound by each of the microbeads is adapted to, following irradiation, produce one or more identifiable spectral signals based on color and/or intensity.

21. The method according to claim 1, wherein in step (a) the particles comprise a combination of quantum dots and magnetic nanoparticles.

22. The method according to claim 1, wherein in step (d), the single flow stream flows out from the chamber into a focusing orifice; wherein in step (e), the single flow stream flows out from the focusing orifice; and wherein a wet diameter ($d_g$) of each of the microbeads is directly dependent upon a diameter of the polymer stream in step (e).

23. The method according claim 22, wherein the wet diameter ($d_g$) of each of the microbeads is determined according to the following equation:

$$d_g = 1.89 d_j$$

wherein $d_j$ is the diameter of the polymer stream in step (e).

24. The method according to claim 1, wherein in step (d), the single flow stream flows out from the chamber into a focusing orifice; wherein in step (e), the single flow stream flows out from the focusing orifice; and wherein a diameter ($d_j$) of the polymer stream in step (e) is dependent upon: a diameter of the focusing orifice in step (e); a density and a flow rate of the polymer solution in step (a); and a density and a flow rate of the focusing fluid in step (b).

25. The method according claim 24, wherein the diameter ($d_j$) of the polymer stream in step (e) is determined according to the following equation:

$$d_j = D\left[1 + \left(\frac{\rho_2}{\rho_1}\right)^{1/2}\left(\frac{Q_2}{Q_1}\right)\right]^{-1/2}$$

wherein
D is the diameter of the exit orifice in step (e),
$\rho_2$ is the density of the focusing fluid in step (b),
$\rho_1$ is the density of the polymer solution in step (a),
$Q_2$ is the flow rate of the focusing fluid in step (b), and
$Q_1$ is the flow rate of the polymer solution in step (a).

26. The method according to claim 25, wherein a wet diameter ($d_g$) of each of the microbeads is directly dependent upon a diameter of the polymer stream in step (e) and is determined according to the following equation:

$$d_g = 1.89 d_j$$

wherein $d_j$ is the diameter of the polymer stream in step (e); and wherein the density ($\rho_1$) of the polymer solution in step (a), the density ($\rho_2$) of the focusing fluid in step (b), and the diameter (D) of the exit orifice in step (e) are predetermined such that, when the flow rate ($Q_1$) of the polymer solution flowing into the chamber is about 1 milliliter per hour (mL/h) and the flow rate ($Q_2$) of the focusing fluid flowing into the chamber is about 180 milliliters per hour (mL/h), the method operatively forms microbeads about 6 micrometers (μm) in diameter.

27. The method according to claim 25, wherein a wet diameter ($d_g$) of each of the microbeads is directly dependent upon a diameter of the polymer stream in step (e) and is determined according to the following equation:

$$d_g = 1.89 d_j$$

wherein $d_j$ is the diameter of the polymer stream in step (e); and wherein the density ($\rho_1$) of the polymer solution in step (a), the density ($\rho_2$) of the focusing fluid in step (b), and the diameter (D) of the exit orifice in step (e) are predetermined such that, when the flow rate ($Q_1$) of the polymer solution flowing into the chamber is about 0.5 milliliters per hour (mL/h) and the flow rate ($Q_2$) of the focusing fluid flowing into the chamber is about 180 milliliters per hour (mL/h), the method operatively forms microbeads about 5 micrometers (μm) in diameter.

28. The method according to claim 1, further comprising a first polymer narrowing step of reducing a cross-sectional profile of the polymer stream before step (a).

29. The method according to claim 28, further comprising a second polymer narrowing step of further reducing the cross-sectional profile of the polymer stream after the first narrowing step and before step (a).

30. The method according to claim 1, wherein in step (b), the focusing fluid flows into the chamber in a focusing stream; and further comprising a focusing fluid narrowing step of reducing a cross-sectional profile of the focusing stream before step (b).

31. A system for forming microbeads comprising:
(a) a polymer solution comprising particles and a polymer dissolved in a solvent;
(b) a focusing fluid capable of reacting with the polymer solution to form functional groups adapted to bind with biorecognition molecules;
(c) a flow focusing apparatus comprising a flow focusing body shaped to define an interior chamber and an exit opening, with the chamber operatively receiving the focusing fluid and a polymer stream of the polymer solution, with the focusing fluid operatively contacting and focusing the polymer stream in the chamber, so as to focus the polymer stream, and with the focusing fluid and the polymer stream focused thereby operatively flowing, as a single flow stream out from the chamber through the exit opening;
wherein pendant droplets operatively detach from a leading end portion of the single flow stream so as to form the microbeads;
wherein each of the microbeads binds an identifiable set of the particles, and
wherein the focusing fluid operatively reacts with the polymer solution to form one or more of the functional groups at a surface of each of the microbeads, such that the microbeads are adapted to bind with the biorecognition molecules.

32. The system according to claim 31, wherein the flow focusing apparatus further comprises a polymer supply subassembly which includes a first polymer nozzle having an entry portion shaped to define an entry opening, an exit portion shaped to define a tip aperture, and a neck portion shaped to define an internal channel running between the entry opening and the tip aperture; wherein the polymer stream operatively flows into the entry opening, through the internal channel, and out from the tip aperture towards the chamber; and wherein the first polymer nozzle is adapted to operatively reduce a cross-sectional profile of the polymer stream during passage therethrough.

33. The system according to claim 32, wherein the polymer supply subassembly additionally includes a second polymer nozzle connected in series after the first polymer nozzle; wherein the polymer stream operatively flows from the tip aperture of the first polymer nozzle into an entry opening defined by an entry portion of the second polymer nozzle, through an internal channel defined by a neck portion of the second polymer nozzle, and out from a tip aperture defined by an exit portion of the second polymer nozzle towards the chamber.

34. The system according to claim 33, wherein the second polymer nozzle comprises a needle member engaging the exit portion of the second polymer nozzle and extending out from the tip aperture of the second polymer nozzle; and wherein the needle member is shaped to define an internal needle channel and a needle tip aperture; wherein the polymer stream operatively flows from the tip aperture of the exit portion of the second polymer nozzle through the needle channel, and out from the needle tip aperture towards the chamber.

35. The system according to claim 33, wherein the second polymer nozzle is adapted to operatively further reduce the cross-sectional profile of the polymer stream during passage therethrough.

36. The system according to claim 32, wherein the flow focusing body is shaped to define a polymer supply opening leading to the chamber; and wherein the polymer supply subassembly securely engages the flow focusing body, with at least part of the polymer supply subassembly being securely received within the polymer supply opening, such that the polymer stream operatively flows from the polymer supply subassembly into the chamber.

37. The system according to claim 31, wherein the flow focusing apparatus further comprises a focusing fluid supply nozzle having an entry portion shaped to define an entry opening, an exit portion shaped to define a tip aperture, and a neck portion shaped to define an internal channel running between the entry opening of the focusing fluid supply nozzle and the tip aperture of the focusing fluid supply nozzle; wherein a focusing stream of the focusing fluid operatively flows into the entry opening of the focusing fluid supply nozzle, through the internal channel of the focusing fluid supply nozzle, and out from the tip aperture of the focusing fluid supply nozzle towards the chamber; and wherein the focusing fluid supply nozzle is adapted to operatively reduce a cross-sectional profile of the focusing stream during passage therethrough.

38. The system according to claim 37, wherein the flow focusing body is shaped to define a focusing fluid supply opening leading to the chamber; and wherein the focusing fluid supply nozzle securely engages the flow focusing body, with at least the exit portion of the focusing fluid supply nozzle being securely received within the focusing fluid supply opening, such that the focusing fluid stream operatively flows from the tip aperture of the focusing fluid supply nozzle into the chamber.

39. The system according to claim 31, further comprising a fluid bath and a receptacle containing the fluid bath to operatively collect the microbeads after detachment from the leading end portion of the single flow stream.

40. The system according to claim 39, wherein the fluid bath contains the focusing fluid.

41. The system according to claim 31, wherein the solvent comprises an organic solvent.

42. The system according to claim 31, wherein the polymer is substantially hydrophobic.

43. The system according to claim 31, wherein the polymer comprises a polystyrene powder or a derivative thereof.

44. The system according to claim 31, wherein the polymer comprises a polystyrene-acid anhydride copolymer.

45. The system according to claim 31, wherein in the polymer solution, the functional groups are protected before operative reaction of the focusing fluid with the polymer solution, and wherein the functional groups are deprotected following operative reaction of the focusing fluid with the polymer solution.

46. The system according to claim 31, wherein the functional groups, at least following operative reaction of the focusing fluid with the polymer solution, comprise carboxylic acid groups.

47. The system according to claim 31, wherein the focusing fluid is water.

48. The system according to claim 31, wherein the particles comprise fluorophores.

49. The system according to claim 31, wherein the particles comprise nanoparticles.

50. The system according to claim 31, wherein the particles comprise quantum dots.

51. The system according to claim 50, wherein the polymer solution comprises a combination of one or more types of the quantum dots, and wherein the identifiable set of the quantum dots bound by each of the microbeads is adapted to, following irradiation, produce one or more identifiable spectral signals based on color and/or intensity.

52. The system according to claim 31, wherein the particles comprise a combination of quantum dots and magnetic nanoparticles.

53. The system according to claim 31, wherein the flow focusing apparatus further comprises a focusing gate shaped to define a focusing orifice therethrough, with the focusing gate substantially obstructing the exit opening of the flow focusing body, and with the focusing orifice leading out from the chamber, such that the single flow stream operatively flows out from the chamber through the focusing orifice, and such that the single flow stream operatively flows out from the focusing orifice.

54. The system according to claim 53, wherein a wet diameter ($d_g$) of each of the microbeads is directly dependent upon a diameter of the polymer stream exiting the focusing orifice.

55. The systems according to claim 54, wherein the wet diameter ($d_g$) of each of the microbeads is determined according to the following equation:

$$d_g = 1.89 d_j$$

wherein $d_j$ is the diameter of the polymer stream exiting the focusing orifice.

56. The system according to claim 53, wherein a diameter ($d_j$) of the polymer stream flowing out from the focusing orifice is dependent upon: a diameter of the focusing orifice as the polymer stream exits therefrom; a density and a flow rate of the polymer solution entering the chamber; and a density and a flow rate of the focusing fluid entering the chamber.

57. The system according claim 56, wherein the diameter ($d_j$) of the polymer stream flowing out from the focusing orifice is determined according to the following equation:

$$d_j = D\left[1 + \left(\frac{\rho_2}{\rho_1}\right)^{1/2}\left(\frac{Q_2}{Q_1}\right)\right]^{-1/2}$$

wherein D is the diameter of the focusing orifice as the polymer stream exits therefrom, $\rho_2$ is the density of the focusing fluid entering the chamber, $\rho_1$ is the density of the polymer solution entering the chamber, $Q_2$ is the flow rate of the focusing fluid entering the chamber, and $Q_1$ is the flow rate of the polymer solution entering the chamber.

58. The system according to claim 57, wherein a wet diameter ($d_g$) of each of the microbeads is directly dependent upon a diameter ($d_j$) of the polymer stream exiting the focusing orifice and is determined according to the following equation:

$$d_g = 1.89 d_j$$

wherein the density ($\rho_1$) of the polymer solution entering the chamber, the density ($\rho_2$) of the focusing fluid entering the chamber, and the diameter (D) of the focusing orifice as the polymer exits therefrom, are predetermined such that, when the flow rate ($Q_1$) of the polymer solution flowing into the chamber is about 1 milliliter per hour (mL/h) and the flow rate ($Q_2$) of the focusing fluid flowing into the chamber is about 180 milliliters per hour (mL/h), the system operatively forms microbeads about 6 micrometers (μm) in diameter.

59. The system according to claim 57, wherein a wet diameter ($d_g$) of each of the microbeads is directly dependent upon a diameter ($d_j$) of the polymer stream exiting the focusing orifice and is determined according to the following equation:

$$d_g = 1.89 d_j$$

wherein the density ($\rho_1$) of the polymer solution entering the chamber, the density ($\rho_2$) of the focusing fluid entering the chamber, and the diameter (D) of the focusing orifice as the polymer exits therefrom, are predetermined such that, when the flow rate ($Q_1$) of the polymer solution flowing into the chamber is about 0.5 milliliters per hour (mL/h) and the flow rate ($Q_2$) of the focusing fluid flowing into the chamber is about 180 milliliters per hour (mL/h), the system operatively forms microbeads about 5 micrometers (μm) in diameter.

* * * * *

UNITED STATES PATENT AND TRADEMARK OFFICE
CERTIFICATE OF CORRECTION

PATENT NO.       : 8,597,729 B2                                    Page 1 of 1
APPLICATION NO.  : 12/666112
DATED            : December 3, 2013
INVENTOR(S)      : Fournier-Bidoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this
Twenty-second Day of September, 2015

Michelle K. Lee
*Director of the United States Patent and Trademark Office*